United States Patent
Deutsch et al.

(10) Patent No.: US 12,423,821 B2
(45) Date of Patent: Sep. 23, 2025

(54) SYSTEMS AND METHODS FOR INTERACTING WITH A LARGE LANGUAGE MODEL

(71) Applicant: OpenAI Opco, LLC, San Francisco, CA (US)

(72) Inventors: Noah Deutsch, San Francisco, CA (US); Benjamin Zweig, San Francisco, CA (US)

(73) Assignee: OpenAI OPCo, LLC, San Francisco, CA (US)

( * ) Notice: Subject to any disclaimer, the term of this patent is extended or adjusted under 35 U.S.C. 154(b) by 0 days.

(21) Appl. No.: 18/742,069

(22) Filed: Jun. 13, 2024

(65) Prior Publication Data

US 2025/0104243 A1  Mar. 27, 2025

Related U.S. Application Data

(63) Continuation of application No. 18/475,722, filed on Sep. 27, 2023, now Pat. No. 12,051,205.

(51) Int. Cl.
*G06T 7/10* (2017.01)

(52) U.S. Cl.
CPC ............ *G06T 7/10* (2017.01); *G06T 2200/24* (2013.01)

(58) Field of Classification Search
CPC .................... G06T 7/10–194; G06V 10/70–87
See application file for complete search history.

(56) References Cited

U.S. PATENT DOCUMENTS

| | | | |
|---|---|---|---|
| 6,549,929 B1* | 4/2003 | Sullivan | H04N 21/4882 725/39 |
| 6,674,905 B1* | 1/2004 | Matsugu | G06T 7/11 382/199 |
| 7,239,740 B1* | 7/2007 | Fujieda | G06T 7/0004 382/150 |
| 9,098,313 B2* | 8/2015 | Butin | G06F 9/453 |
| 9,405,558 B2* | 8/2016 | Butin | G06F 9/453 |

(Continued)

OTHER PUBLICATIONS

Peng Xu et al., Multimodal Learning with Transformers: A Survey, arXiv:2206.06488, May 10, 2023.

(Continued)

*Primary Examiner* — Sean T Motsinger
(74) *Attorney, Agent, or Firm* — Finnegan, Henderson, Farabow, Garrett & Dunner, LLP

(57) ABSTRACT

Disclosed embodiments may include a method of interacting with a multimodal machine learning model; the method may include providing a graphical user interface associated with a multimodal machine learning model. The method may further include displaying an image to a user in the graphical user interface. The method may also include receiving a textual prompt from the user and then generating input data using the image and the textual prompt. The method may further include generating an output at least in part by applying the input data to the multimodal machine learning model, the multimodal machine learning model configured using prompt engineering to identify a location in the image conditioned on the image and the textual prompt, wherein the output includes a first location indication. The method may also include displaying, in the graphical user interface, an emphasis indicator at the indicated first location in the image.

20 Claims, 15 Drawing Sheets

(56) References Cited

U.S. PATENT DOCUMENTS

| | | | |
|---|---|---|---|
| 10,089,742 B1* | 10/2018 | Lin | G10L 15/26 |
| 11,314,982 B2 | 4/2022 | Price et al. | |
| 11,568,627 B2 | 1/2023 | Price et al. | |
| 11,615,567 B2* | 3/2023 | Harikumar | G06V 10/82 |
| | | | 382/173 |
| 11,995,298 B1* | 5/2024 | Rubinstein | G06F 9/451 |
| 12,051,205 B1 | 7/2024 | Deutsch et al. | |
| 2002/0064382 A1* | 5/2002 | Hildreth | G06T 7/254 |
| | | | 348/169 |
| 2004/0240708 A1* | 12/2004 | Hu | G06V 10/757 |
| | | | 382/103 |
| 2007/0273658 A1* | 11/2007 | Yli-Nokari | G06F 3/03547 |
| | | | 345/173 |
| 2010/0135566 A1* | 6/2010 | Joanidopoulos | G06V 20/698 |
| | | | 382/133 |
| 2014/0359521 A1* | 12/2014 | Lin | G06F 3/04842 |
| | | | 715/810 |
| 2017/0308388 A1* | 10/2017 | Gerphagnon | G06F 9/451 |
| 2018/0268548 A1* | 9/2018 | Lin | G06N 3/084 |
| 2019/0236394 A1* | 8/2019 | Price | G06V 10/945 |
| 2020/0143194 A1 | 5/2020 | Hou et al. | |
| 2020/0234084 A1* | 7/2020 | Seaton | G06N 3/045 |
| 2021/0248748 A1 | 8/2021 | Turgutlu et al. | |
| 2021/0383171 A1* | 12/2021 | Lee | G06N 3/045 |
| 2021/0390700 A1* | 12/2021 | Lee | G06F 18/25 |
| 2022/0050661 A1* | 2/2022 | Lange | G06V 20/00 |

OTHER PUBLICATIONS

International Search Report for PCT application No. PCT/US2024/048703, dated Dec. 24, 2024, 4 pages.

\* cited by examiner

SYSTEMS AND METHODS FOR INTERACTING WITH A LARGE LANGUAGE MODEL

CROSS-REFERENCE TO RELATED APPLICATIONS

This application is a continuation of U.S. Application Ser. No. 18/475,722, filed Sep. 27, 2023 (now U.S. Pat. No. 12,051,205) which is incorporated herein by reference in its entirety.

FIELD OF DISCLOSURE

The disclosed embodiments relate generally to methods and systems for interacting with machine learning models. More specifically, and without limitation, this disclosure relates to systems and methods for interacting with a multimodal machine learning model using graphical interfaces.

BACKGROUND

Machine learning models are programs that have been trained to recognize certain types of patterns from data they process. Multimodal large language models (LLMs), in particular, are capable of processing multiple types of input data, such as text, images, videos, and other sensory inputs. Users can interact with a machine learning model such as a multimodal LLM (also referred to as the "model" throughout this disclosure) via a graphical user interface (GUI). This can be in the format of a textual conversation, where the model can perform certain tasks within the GUI given a user-provided textual input. These tasks may include a task of the model, given an image and textual prompt, notifying the user where on the image a certain visual element can be found.

Conventional ways of interacting with a user interface (UI), such as a GUI, require a user to manipulate an indicator, such as a cursor, across a display in order to carry out a particular task. For example, a user may want to edit a given image within a particular application. This may include manipulating a cursor to manually select certain elements of the image. Manually selecting elements from an image may be a tedious task, often requiring a great deal of precision on the part of the user when dealing with images. For example, a user may struggle to accurately select a particular element from an image if the element is of an irregular shape. The user may also be unfamiliar with how to correctly interact with certain features of the GUI and thus not able to accurately select a particular element from the image. Also, users with certain vision-related disabilities may not be able to locate or select particular elements from an image and may require assistance from a third party in order to interact with the UI successfully. For example, a user with color-blindness would not be able to manually select elements of a particular color from within an image.

Another task a user may want to carry out within a GUI is the action of saving a document. This may include manipulating a cursor to manually select buttons within the GUI that allow for a document opened within the GUI to be saved. A user unfamiliar with how to interact correctly with the GUI risks losing important information written within an open document that has not yet been saved. The same risk applies to users with vision-related disabilities who may not be able to select the particular buttons that allow for a document to be saved. These challenges contribute to negative experiences on the part of the user interacting with the UI, sometimes preventing the users from being able to use the UI altogether.

Present machine learning models, including multimodal LLMs, are typically limited to responding to user queries, including those pertaining to a particular image displayed within a GUI, with words, resulting in answers in the form of blocks of text. Such blocks of text do not always result in a user being able to identify or select a certain visual element within an image pertaining to the response of the model, particularly when the user is visually impaired, and thus there remains an unsatisfying user experience with the GUI. Restricting the model to respond to queries with words also leads to intensive use of resources, because the model would have to output numerous tokens in order to provide a response that the user cannot misinterpret. A token can be a sequence of characters that represents a meaningful unit of text, such as a word, a punctuation mark, a number, or any other symbol that has a semantic or syntactic role in the text.

The embodiments discussed herein address one or more of the above shortcomings, as well as others that are readily apparent in the prior art, by providing methods and systems having machine learning models, such as multimodal LLMs, that are able to generate visual responses to user queries in addition to or instead of textual responses.

SUMMARY

Embodiments of the present disclosure present technological improvements as solutions to one or more of the above-mentioned technical problems recognized by the inventors in conventional systems. For example, the presently disclosed embodiments may include a method of interacting with a multimodal machine learning model; the method may include providing a graphical user interface associated with a multimodal machine learning model. The method may further include displaying an image to a user in the graphical user interface. The method may also include receiving a textual prompt from the user and then generating input data using the image and the textual prompt. The method may further include generating an output at least in part by applying the input data to the multimodal machine learning model, the multimodal machine learning model configured using prompt engineering to identify a location in the image conditioned on the image and the textual prompt, wherein the output includes a first location indication. The method may also include displaying, in the graphical user interface, an emphasis indicator at the indicated first location in the image.

According to some disclosed embodiments, displaying the emphasis indicator at the indicated first location in the image includes placing a cursor of the graphical user interface at the first location in the image.

According to some disclosed embodiments, displaying the emphasis indicator at the indicated first location in the image includes displaying an updated image that includes the emphasis indicator at the indicated first location.

According to some disclosed embodiments, the first location indication includes coordinates or a token corresponding coordinate.

According to some disclosed embodiments, generating the input data includes combining the image with a spatial encoding.

According to some disclosed embodiments, the output further includes a textual response and displaying the emphasis indicator at the indicated first location includes displaying a graphic and the textual response at the indicated first location.

According to some disclosed embodiments, generating the output includes generating an initial location indication by applying the input data to the multimodal machine learning model, generating an updated image that depicts an initial emphasis indicator at the indicated initial location in the image, generating second input data using the updated image, and generating the output by applying the second input data to the multimodal machine learning model.

According to some disclosed embodiments, the output includes multiple location indications, the multiple location indications including the first location indication, and the method further includes displaying emphasis indications at the multiple indicated locations in the image.

According to some disclosed embodiments, the output includes a sequence of location indications, the sequence of location indicating the first location indication, and the method further includes sequentially displaying emphasis indicators at the sequence of indicated locations in the image.

According to some disclosed embodiments, the multimodal machine learning model may be configured using the prompt engineering to identify the location in the image and a display or action parameter, and the output includes the first location indication and the display or action parameter.

According to some disclosed embodiments, the method further includes generating an image segment encompassing the indicated first location by applying the image to a segmentation model, and displaying the emphasis indicator at the indicated first location in the image includes modifying at least one visual characteristic of a portion of the image within the image segment.

The presently disclosed embodiments may include a system comprising at least one processor and at least one non-transitory computer readable medium containing instructions that, when executed by the at least one processor, cause the system to perform operations comprising providing a graphical user interface associated with a multimodal machine learning model. The operations may further comprise displaying an image to a user in the graphical user interface, receiving a textual prompt from the user, generating input data using the image and the textual prompt, generating an output at least in part by applying the input data to the multimodal machine learning model, the multimodal machine learning model being configured using prompt engineering to identify a location in the image conditioned on the image and the textual prompt, wherein the output comprises a first location indication, and displaying, in the graphical user interface, an emphasis indicator at the indicated first location in the image.

The presently disclosed embodiments may also include server comprising a networking element connected online and configured to receive requests from client devices. The server may include one or more processors that perform operations comprising providing a graphical user interface associated with a multimodal machine learning model. The operations may further comprise displaying an image to a user in the graphical user interface, receiving a textual prompt from the user, generating input data using the image and the textual prompt, generating an output at least in part by applying the input data to the multimodal machine learning model, the multimodal machine learning model being configured using prompt engineering to identify a location in the image conditioned on the image and the textual prompt, wherein the output comprises a first location indication, and displaying, in the graphical user interface, an emphasis indicator at the indicated first location in the image.

Other methods and systems are also discussed within. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1:
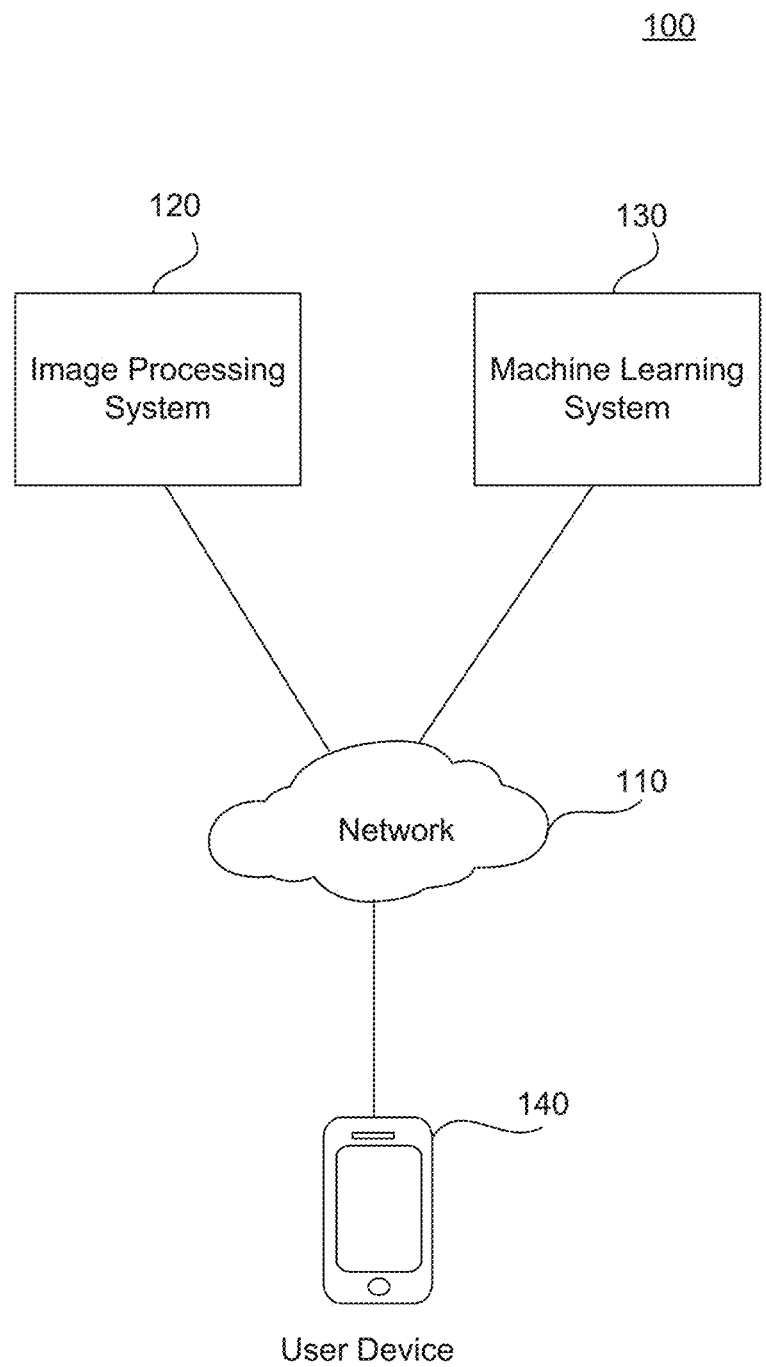
FIG. 1 depicts an exemplary system in which the embodiments of the present disclosure are implemented.

Exemplary embodiments are described with reference to the accompanying drawings. In the figures, the left-most digit(s) of a reference number identifies the figure in which the reference number first appears. In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed (e.g., executed) simultaneously, at the same point in time, or concurrently. Reference will now be made in detail to the disclosed embodiments, examples of which are illustrated in the accompanying drawings.

It is to be understood that both the foregoing general description and the following detailed description are exemplary and explanatory only and are not restrictive of this disclosure. The accompanying drawings, which are incorporated in and constitute a part of this specification, illustrate several exemplary embodiments and together with the description, serve to outline principles of the exemplary embodiments.

The embodiments discussed herein involve or relate to artificial intelligence (AI). AI may involve perceiving, synthesizing, inferring, predicting and/or generating information using computerized tools and techniques (e.g., machine learning). For example, AI systems may use a combination of hardware and software as a foundation for rapidly performing complex operation to perceive, synthesize, infer, predict, and/or generate information. AI systems may use one or more models, which may have a particular configuration (e.g., model parameters and relationships between those parameters, as discussed below). While a model may have an initial configuration, this configuration can change over time as the model learns from input data (e.g., training input data), which allows the model to improve its abilities. For example, a dataset may be input to a model, which may produce an output based on the dataset and the configuration of the model itself. Then, based on additional information (e.g., an additional input dataset, validation data, reference data, feedback data), the model may deduce and automatically electronically implement a change to its configuration that will lead to an improved output.

Powerful combinations of model parameters and sufficiently large datasets, together with high-processing-capability hardware, can produce sophisticated models. These models enable AI systems to interpret incredible amounts of information according to the model being used, which would otherwise be impractical, if not impossible, for the human mind to accomplish. The results, including the results of the embodiments discussed herein, are astounding across a variety of applications. For example, an AI system can be configured to autonomously navigate vehicles, automatically recognize objects, instantly generate natural language, understand human speech, and generate artistic images.

As current ways of interacting with machine learning models restrict models to providing textual responses to user requests, there exists difficulty on the part of the user in understanding what the response of the model pertains to, and difficulty on the part of the model in communicating a response the user can correctly interpret. The disclosed embodiments improve the technical field of interacting with machine learning models by giving the model the ability to provide to the user with a graphical indication emphasizing a region within a GUI pertaining to its response.

For example, according to some embodiments, in response to a textual query from a user to identify an area or element of interest in a particular image, a machine learning model such as a multimodal LLM can indicate the area or areas on the image by visually displaying an emphasis indicator (also referred to as an emphasis indication throughout this disclosure), such as a cursor, at the location of the area or element. Additionally, the multimodal LLM can output coordinates, e.g., (X, Y) of the location of the area or element. Such a visual response by the multimodal LLM removes the need for a lengthy response detailing the location of a particular element or area, as well as mitigates the quantity of resources that otherwise would be required to output numerous tokens.

FIG. 1 is a schematic diagram illustrating an exemplary system environment in which the disclosed systems and methods for interacting with machine learning models such as multimodal LLMs can be employed.

System 100 may include any number, or any combination of the system environment components shown in FIG. 1 or may include other components or devices that perform or assist in the performance of the system or method consistent with disclosed embodiments. The arrangement of the components of system 100 shown in FIG. 1 may vary.

FIG. 1 shows system 100, including image processing system 120, machine learning system 130, and user device 140 communicatively connected via network 110. In some embodiments, a user may access and interact with a machine learning model hosted by machine learning system 130 via a GUI run on user device 140, for example, to submit requests in relation to one or more images or to manipulate such one or more images. To respond to such requests, the machine learning model may employ image processing system 120 when processing images according to the requests submitted by the user.

Network 110 may be a wide area network (WAN), local area network (LAN), wireless local area network (WLAN), Internet connection, client-server network, peer-to-peer network, or any other network or combination of networks that would enable the system components to be communicably linked. Network 110 enables the exchange of information between components of system 100 such as image processing system 120, machine learning system 130, and user device 140.

Image processing system 120 can be configured to perform the execution of tasks such as image acquisition, analysis, and manipulation. Manipulation may include image enhancement, segmentation, restoration, compression, etc. In some embodiments, image processing system 120 can be a conventional image processing system.

Machine learning system 130 may host one more or more machine learning models, such as a multimodal LLM. In some embodiments, machine learning system 130 also manages the training of at least one machine learning model. In some embodiments, machine learning system 130 can be a conventional machine learning system.

User device 140 can be any of a variety of device type, such as a personal computer, a mobile device like a smartphone or tablet, a client terminal, a supercomputer, etc. In some embodiments, user device 140 includes at least one monitor or any other such display device. In some embodiments, user device 140 includes at least one of a physical keyboard, on-screen keyboard, or any other input device through which the user can input text. In some embodiments, user device 140 allows a user to interact with a GUI (for example a GUI of an application run on or supported by user device 140) using a machine learning model. For example, while interacting with the GUI, the user of user device 140 may interact with a multimodal LLM that automates, for the user, certain functions of the GUI in cooperation with image processing system 120 and/or machine learning system 130.

Figure 2:
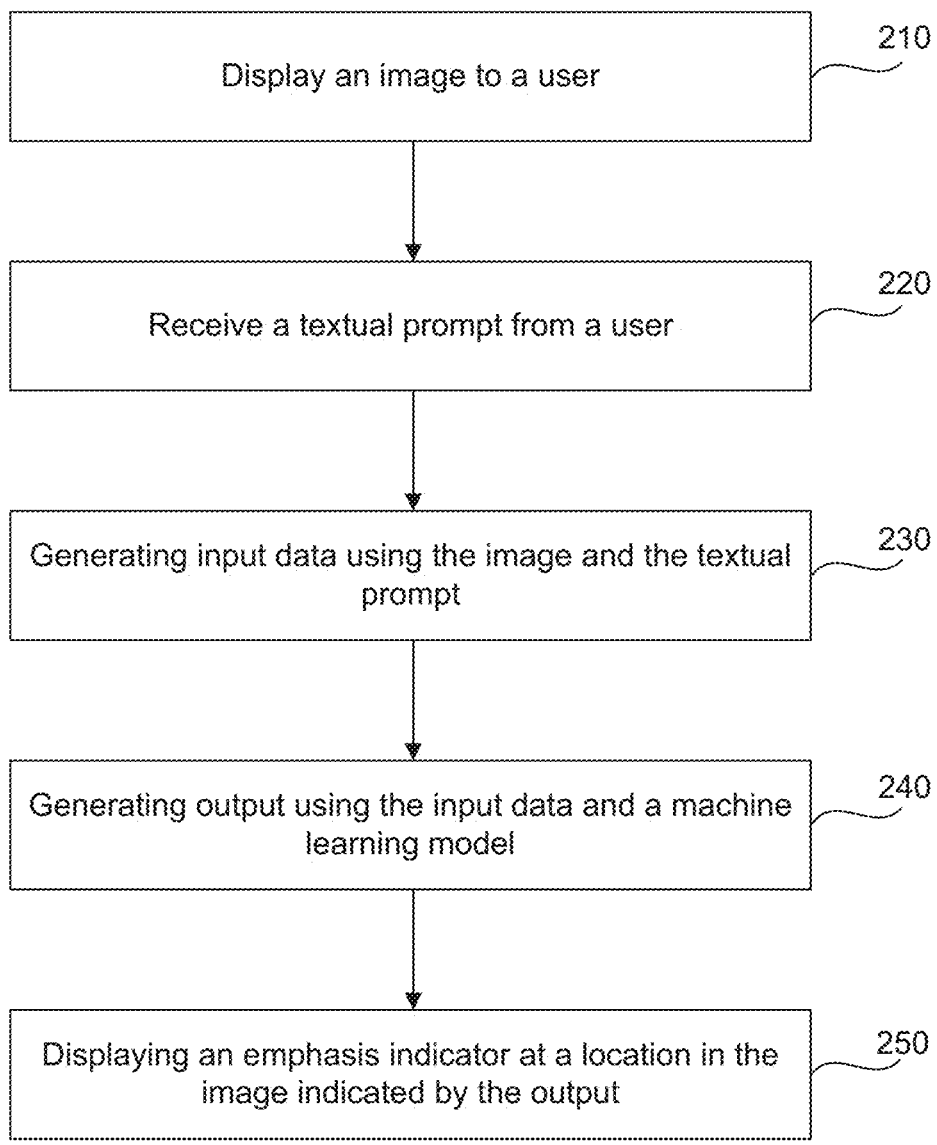
FIG. 2 depicts an exemplary method for interacting with a machine learning model such as a multimodal LLM, according to some embodiments of the present disclosure.

FIG. 2 depicts an exemplary method 200 for interacting with a machine learning model, such as a multimodal LLM, according to some embodiments of the present disclosure.

Method 200 can be performed (e.g., executed) by a system supporting the use of machine learning models, such as system 100 of FIG. 1, or any computing device. In some embodiments, method 200 can be implemented using at least one processor (e.g., processor 1006 in FIG. 10), which may execute one or more instructions stored in memory, such as on a computer-readable medium (e.g., data storage device 1008 in FIG. 10). For ease of explanation, steps of method 200 are described as being performed by the at least one processor; however, other components or devices could be used additionally or instead as appropriate. While the steps in FIG. 2 are shown in a particular exemplary order, it is appreciated that the individual steps may be reordered, omitted, and/or repeated. Steps described in method 200 may include performing operation described in the present disclosure with reference to FIGS. 1 and 4 to 9.

In some embodiments, method 200 begins at step 210 as shown in FIG. 2. At step 210, at least one processor displays an image to a user. For example, the at least one processor can cause the image to be displayed via a graphical user interface on user device 140.

In some embodiments, the image displayed to the user may be selected by the at least one processor or the machine learning model. The at least one processor or the machine learning model may select the image randomly, or at the request of the user, for example, given a specific prompt, from pre-stored images or images obtained from elsewhere such as, for example, from a source found on the Internet. In some embodiments the image may be uploaded by the user or downloaded by the user from another source. In some embodiments, the image may be generated by the machine learning model. The machine learning model may generate the image randomly, or at a request of the user, for example, given a specific prompt. In some embodiments, the image may be a current screen shot of the GUI state shown to the user. The image may also be obtained in an alternative way to the preceding examples.

At step 220 shown in FIG. 2, the at least one processor receives a textual prompt from the user. In some embodiments, the user may input this textual prompt via a GUI on user device 140. A textual prompt may be, but not limited to, a request to locate a particular element or object within the image, a request to interact with a particular element of the image, a request to segment a particular element of the image, or a different request related to the image or its content.

At step 230 shown in FIG. 2, the at least one processor generates input data using the image and the textual prompt received from the user. In some embodiments, the input data may be generated in the form that could be applied to the machine learning model and provide such a model with information necessary to complete the request defined by the textual prompt. For example, if the machine learning model is a transformer type model, generating the input data can comprise the at least one processor tokenizing both the image and textual prompt of the user into separate sequences of tokens. Tokenization refers to the splitting of an input into discrete parts than can subsequently be embedded into a vector space, allowing the input to be passed into the machine learning model.

The type of tokenization may be dependent on the modality of the input. In some embodiments, tokenization of the textual prompt can be, but not limited to, each word in the prompt. In some embodiments, tokenization of the image can be one or more of patches, region-of-interest (RoI), or any other type of tokenization suitable for an image.

In some embodiments, after tokenization of both the textual prompt and the image, the at least one processor can concatenate the tokenized textual prompt and the tokenized image to form a singular tokenized input for embedding into a vector space.

In some embodiments, the at least one processor can generate an embedding of the concatenated tokenized input into a vector space using one or more of a convolutional neural network (CNN), a linear projection, a learned embedding, a graph neural network (GNN), or any other type of suitable embedding process.

In some embodiments, generating the input data includes combining the image with a spatial encoding. A spatial encoding allows for the machine learning model to obtain positional information about certain elements from within the image. In some embodiments, combining the image with a spatial encoding can comprise overlaying the original image with the spatial encoding. For example, a spatial encoding can be one or more of regular or irregular repeating gridlines, any other type of tessellation, or any other suitable spatial encoding from which locations can be contextualized within an image.

In some embodiments, combining the image with a spatial encoding can occur before tokenization of the input modalities. In some embodiments, combining the image with a spatial encoding can occur after tokenization of the input modalities. In some embodiments, combining the image with a spatial encoding can occur before or after displaying the image to the user at step 210, or at step 250.

At step 240 shown in FIG. 2, the at least one processor generates an output using at least in part the input data and the machine learning model. In some embodiments, the output may be generated by, at least in part, applying the input data to the machine learning model of machine learning system 130 and indicates one or more locations in the image corresponding to a user request set out in the textual prompt.

For example, in some embodiments, the machine learning model may be configured using prompt engineering to identify a location in the image conditioned on the image and the textual prompt. Prompt engineering refers to an AI engineering technique implemented in order to optimize machine learning models such as multimodal LLMs for particular tasks and outputs. Prompt engineering involves creating precise and informative questions or instructions that allow the model to output the desired response. These prompts serve as precise inputs that direct the behavior of the model. For example, a user interacting with the model can modify and control its output by carefully structuring their textual prompts, which increases the usefulness and accuracy of the responses from the model. Prompt engineering may involve different techniques for text-to-text, text-to-image, and non-text prompts. Text-to-text techniques may include Chain-of-thought, Generated knowledge prompting, Least-to-most prompting, Self-consistency decoding, Complexity-based prompting, Self-refine, Tree-of-thought, Maieutic prompting, and Directional-stimulus prompting. Text-to-text techniques may also include automated generation such as Retrieval-augmented generation. Text-to-image techniques may include Prompt formats, Artist styles, and Negative prompts. And non-text prompts may include Textual inversion and embeddings, Image prompting, and Using gradient descent to search for prompts.

In some embodiments, input data generated by the at least one processor can comprise the image, the textual prompt of the user, and a prepended textual prompt generated by, for example, the model through prompt engineering. In some embodiments, this prepended textual prompt can direct the model to produce an output of a particular format. For example, in some embodiments, the prepended textual prompt can specify that the locations of emphasis within the image, conditioned on the textual prompt of the user, must comprise any of at least one set of (X, Y) coordinates of the location in the image, a token corresponding to coordinates, or any other suitable values related to positions within the image.

For example, if a textual prompt from a user asks to locate a particular object within an image, the prepended textual prompt, generated through prompt engineering, may specify to the model that its output must comprise a set of (X, Y) coordinates.

The output generated in step 240 may comprise an indication of the location in the image (e.g., an initial or first location indication) relevant to the user request. In some embodiments, the location indication includes at least one set of (X, Y) coordinates of the location in the image or a token corresponding to coordinates.

In some embodiments, the output further includes a textual response, e.g., a description of the location in the image. In some embodiments, the textual response may be in the form of a caption accompanying the location indication. In some embodiments, the output includes multiple location indications of multiple locations in the image relevant to the user request. In some embodiments, the output includes a sequence of location indications of a respective sequence of locations in the image relevant to the user request.

In some embodiments, the machine learning model may be configured using prompt engineering to identify the location in the image and a display or action parameter, and the output also includes the first location indication and the display or action parameter. A display or action parameter directs the model to display something within an image or GUI or perform an action on an image or GUI. In some embodiments, method 200 may comprise generating an image segment encompassing the indicated first location by applying the image to a segmentation model of image processing system 120.

In some embodiments, the segmentation model of image processing system 120 may be configured to perform semantic segmentation. Semantic segmentation may include a deep learning algorithm that assigns a class label to every pixel within an image. For example, a segmentation model of image processing system 120 can be configured to recognize certain objects within an image, such as but not limited to, human beings, animals, inanimate objects etc.

At step 250 shown in FIG. 2, the at least one processor may display an emphasis indicator at the location in the image indicated by the output. For example, the at least one processor may impose an emphasis indicator, such as a cursor, onto the image displayed via the GUI at user device 140 at the location in the image indicated by the first location indication included in the output generated using the machine learning model. In some embodiments, displaying the emphasis indicator at the location indicated by the first location indication includes displaying an updated image that includes the emphasis indicator at the indicated first location.

In some embodiments, displaying the emphasis indicator at the indicated first location includes displaying an emphasis indicator (e.g., a graphic) at the indicated first location along with a textual response. For example, the output generated by the machine learning model may also include a textual response, such as about the identified location or an element of the image is being selected, for displaying together with the emphasis indicator.

In some embodiments, when the output generated using the machine learning model includes multiple location indications, method 200 may comprise displaying emphasis indications at the multiple indicated locations within the image. In some embodiments, when the output generated using the machine learning model includes a sequence of location indications, method 200 may comprise sequentially displaying emphasis indicators at the sequence of indicated locations within the image. For example, as is described in FIG. 9 discussed below, a sequence of emphasis indications may be displayed in order to form an animation, as per the textual prompt of the user.

In some embodiments, the machine learning model may be configured using prompt engineering to identify a 'display' or 'action' parameter that specifies a type of the emphasis indicator for displaying in the image. In some embodiments, the prompt engineering specifies a set of visually distinct types of emphasis indicators, where the machine learning model selects one of the specified sets of visually distinct types for the display or action parameter to specify. The selected type may be selected randomly or may depend on the user request, such as on the subject matter underlying the request. In some embodiments, the user themselves may choose a type of emphasis indicator from a selection of emphasis indicators in a menu within the GUI.

In further embodiments, the display or action parameter may specify an action that could be performed in the GUI. Displaying the emphasis indicator at the indicated location may comprise placing a cursor of the GUI at the indicated location and performing the corresponding action in the GUI.

In further embodiments, when the method includes generating an image segment encompassing the indicated location, displaying the emphasis indicator at the indicated location in the image may comprise modifying at least one visual characteristic of a portion of the image within the image segment.

Different types of emphasis indicators may be used by method 200. For example, emphasis indicators may take the form of, but are not limited to, cursors, icons/images, stickers, drawings, digital annotation tool markings, overlaid text, etc. When multiple emphasis indicators are to be displayed, e.g., within the image or overlaying the image in the GUI, different types and/or sizes of emphasis indicators may be used.

Figure 3:
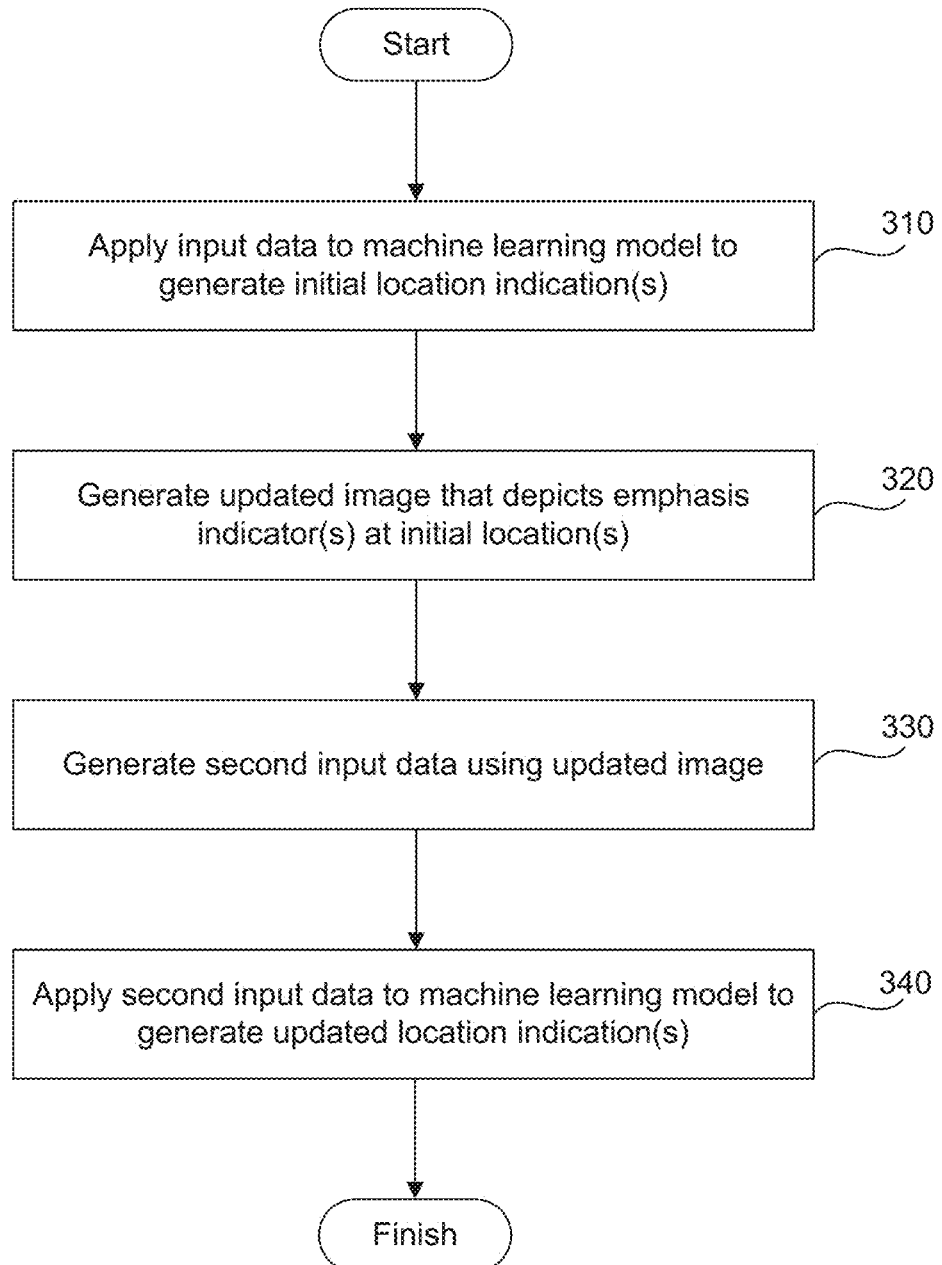
FIG. 3 illustrates an exemplary process for updating an emphasis indicator on an image, according to some embodiments of the present disclosure.

FIG. 3 depicts exemplary method 300 for interacting with a machine learning model, such as a multimodal LLM, according to some embodiments of the present disclosure. As method 200, method 300 can be performed (e.g., executed) by a system supporting the use of machine learning models, such as system 100 of FIG. 1, or any computing device. In some embodiments, method 300 can be implemented using at least one processor (e.g., processor 1006 in FIG. 10), which may execute one or more instructions stored in memory, such as on a computer-readable medium (e.g., data storage device 1008 in FIG. 10). For ease of explanation, steps of method 300 are described as being performed by the at least one processor; however, other components or devices could be used additionally or instead as appropriate. While the steps in FIG. 3 are shown in a particular exemplary order, it is appreciated that the individual steps may be reordered, omitted, and/or repeated. Steps described in method 300 may include performing operation described in the present disclosure with reference to FIGS. 1, 2, and 4 to 9. Method 300 can also be performed as part of another process or method, such as method 200.

In some embodiments, method 300 begins at step 310. At step 310 shown in FIG. 3, at least one processor applies input data to a machine learning model, such as a multimodal LLM, to generate one or more location indications of locations in an image.

The input data may be generated based on the image and textual input from a user, as for example described with reference to step 230 of FIG. 2. In some embodiments, method 300 may be performed as part of or in conjunction with method 200 and step 310 may use the input data generated in step 230 of method 200. In some embodiments, method 300 may be performed independently of method 200. In such embodiments, the at least one processor may display the image to a user, receive a textual prompt related to the image from the user, and generate the input data using the image and textual prompt (e.g., in the manner described with reference to FIG. 2 concerning steps 210, 220 and 230).

At step 320, the at least one processor generates an updated image that has emphasis indicator(s) at the one or more locations identified by the initial location indication(s) generated in step 310.

At step 330, the at least one processor generates a second input data using the updated image generated at step 320 and original textual prompt. In some embodiments, the input data may be generated in the form that could be applied to the machine learning model. For example, if the machine learning model is a transformer type model, generating the second input data can again comprise the at least one processor tokenizing the updated image into separate sequences of tokens for embedding into a vector space.

In some embodiments, generating the second input data includes combining the updated image with a spatial encoding, allowing for the machine learning model to obtain positional information about certain elements from within the image. In some embodiments, combining the image with a spatial encoding can comprise overlaying the updated image with the spatial encoding. For example, a spatial encoding can be one or more of regular or irregular repeating gridlines, any other type of tessellation, or any other suitable spatial encoding from which locations can be contextualized within an image.

In some embodiments, combining the updated image with a spatial encoding can occur before tokenization of the updated image. In some embodiments, combining the updated image with a spatial encoding can occur after tokenization of the updated image.

In step 340, the at least one processor applies the second input data generated at step 330 to the machine learning model, such as a multimodal LLM, in order to generate the original image with updated emphasis indication(s) at updates location indications. These updated emphasis indications are more accurately positioned than the emphasis indications at the initial location indication(s) of step 310, considering the user request. For example, emphasis indication(s) on an image may not correspond to the coordinates determined by the model in its output.

Performing method 300 allows the model to check that the emphasis indication(s) placed by the at least one processor reflect the generated location coordinates by the model in its output, for example at step 340 where the second input data is applied to the machine learning model. If the model determines that the initial emphasis indication(s) placed by the at least one processor do not reflect its generated location coordinates, the at least one processor generates original image with emphasis location indication(s), for example at step 340, in order to display more accurate emphasis indication(s) to the user.

In some embodiments, steps 330 and 340 can be performed multiple times using the image with updated location indication(s) as input data, in order to reach more accurate emphasis indication(s) in each iteration. This ensures that the most accurate emphasis indication(s) possible are obtained before displaying to the user.

In some embodiments, the disclosed methods and processes can be performed using a video, GIF, PDF, or other rich mixed media instead of an image.

Figure 4A:
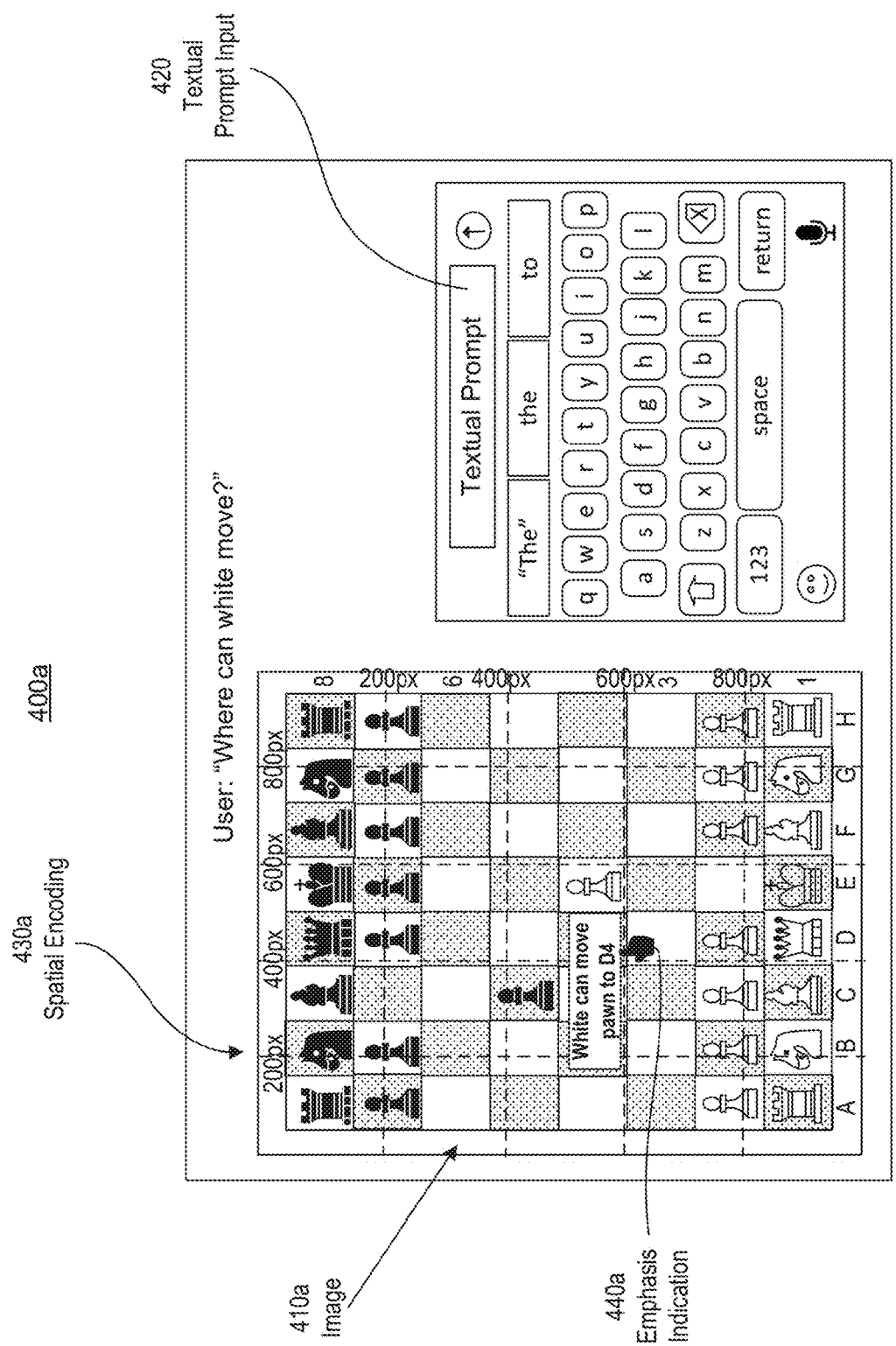
FIGS. 4A, 4B, and 4C illustrate example views of images with emphasis indicators with an example textual input interface, according to some embodiments of the present disclosure.
Figure 4B:
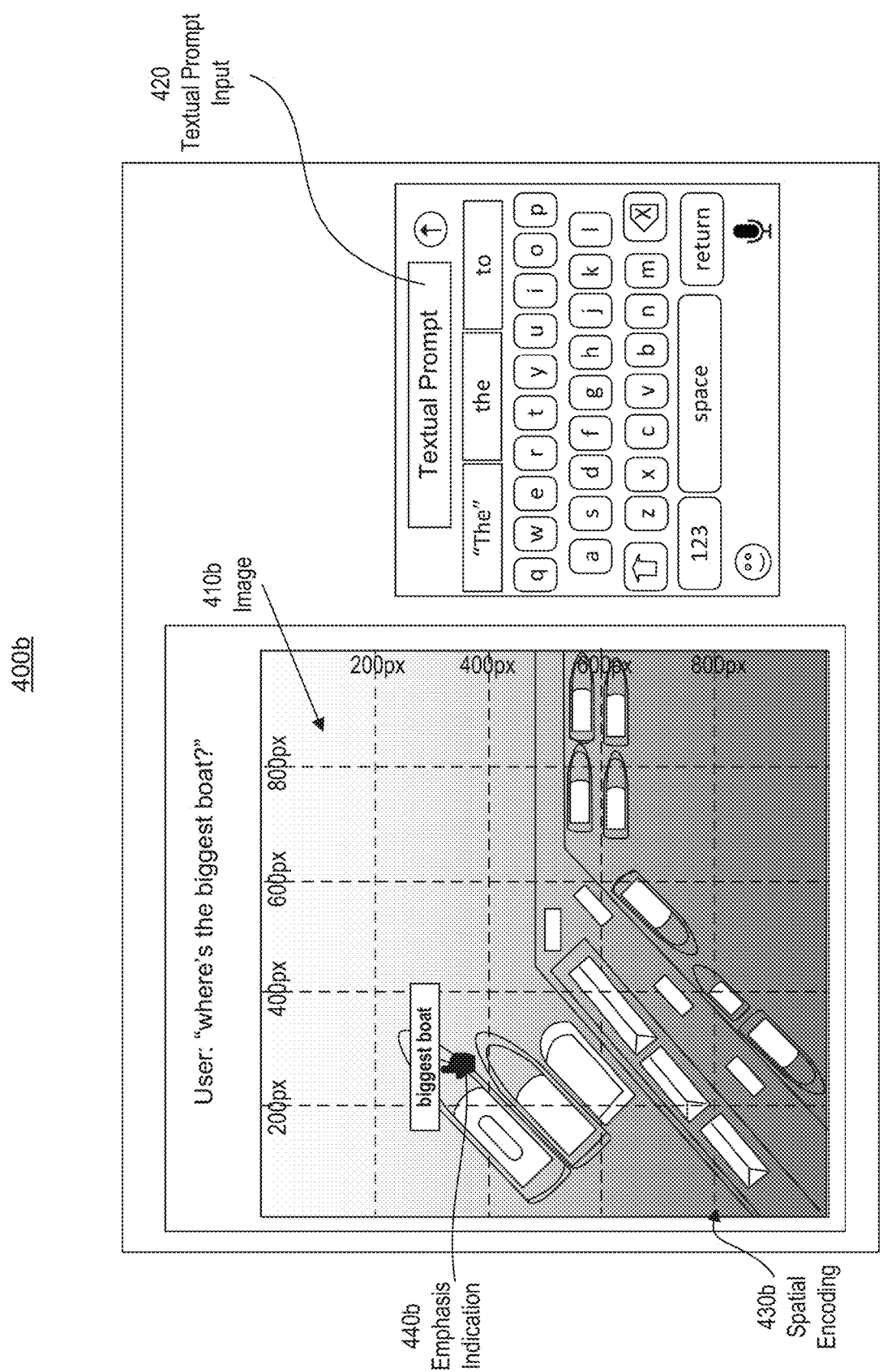
Figure 4C:
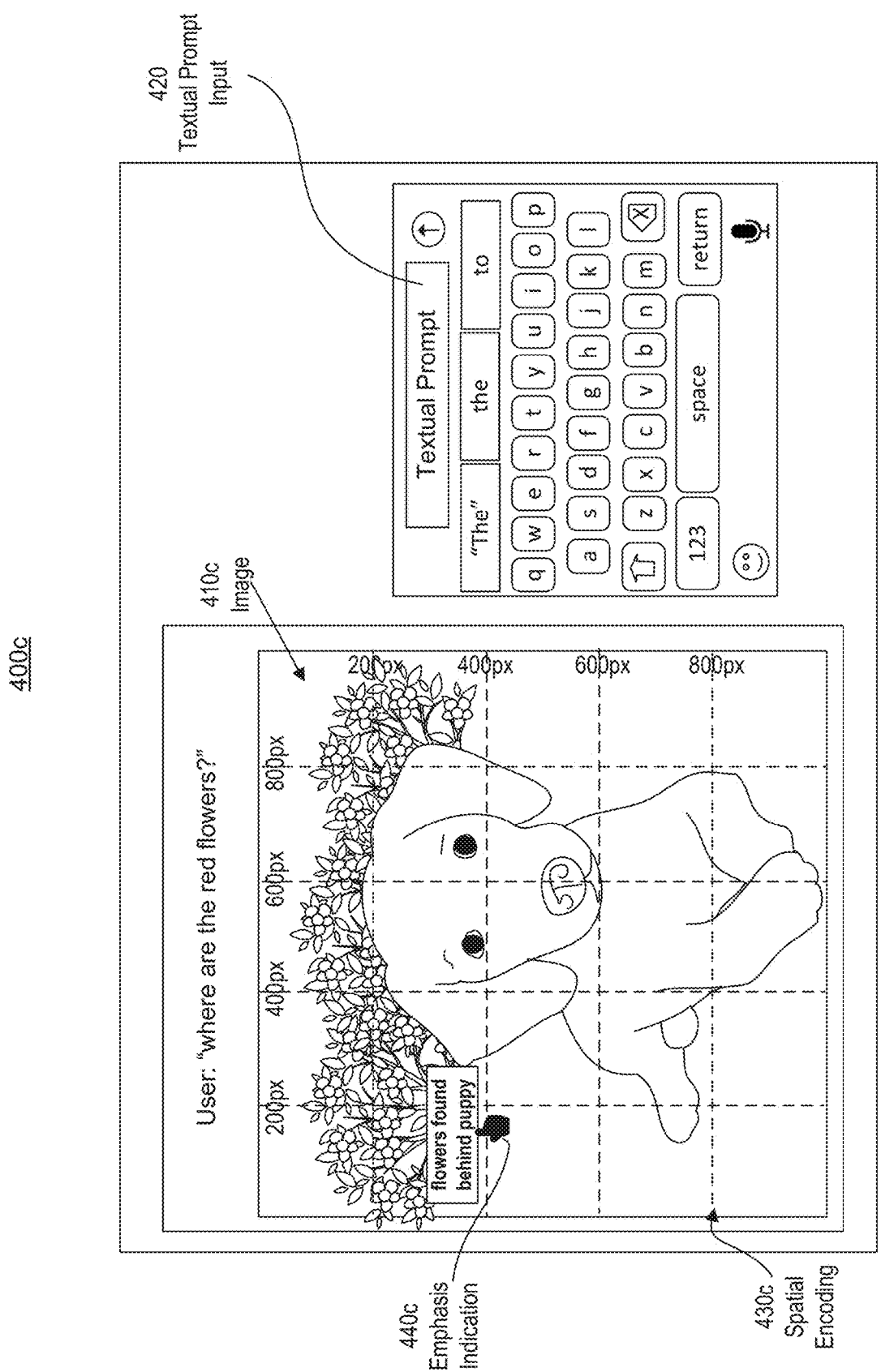

FIGS. 4A to 4C illustrate example views of images with emphasis indicators with an example textual input interface, according to some embodiments of the present disclosure.

FIG. 4A shows an example view 400a of image 410a depicting a frame of a chess game taking place on a chess board. Image 410a may be displayed to a user via a GUI on a user device 140, for example, as described with reference to step 210 of method 200. Item 420 may be an example interface of the GUI which a user can use to input a textual prompt. As for example described with reference to step 220 of method 200, such a textual prompt could be received by at least one processor. In the scenario of FIG. 4A, the textual prompt inputted by the user may be "Where can white move?" The user textual prompt and image 410a are used by the at least one processor to generate input data, as for example, described in step 230 of method 200.

In the case of view 400a, spatial encoding 430a may be applied to the image, for example as part of the generation of input data by the at least one processor. In this scenario, spatial encoding 430a may be in the form of regular repeating gridlines. The at least one processor generates an output by applying the input data to the machine learning model of machine learning system 130, as for example, described in step 240 of method 200. In the case of view 400a, the model may be able to recognize, through the application of prompt engineering as described above in relation to step 240 of method 200, the next allowable moves for the white chess pieces. The output generated includes a location indication at one of the possible locations on the chess board a white chess piece can move, as well as an accompanying textual response from the model. In the case of view 400a, the location indication includes, for example, a set of coordinates within spatial encoding 430a.

Emphasis indication 440a may be placed at the generated output comprising a location indication, as for example, described in step 250 of method 200. In the case of view 400a, the model or user has chosen a symbol of a hand with a pointing finger as the most appropriate emphasis indicator 440. The textual response may be also displayed next to emphasis indication 440a at the indicated location in the form of a caption reading "White can move pawn to D4." When the result is shown to the user via the GUI, spatial encoding 430a may be included along with the image 410a with emphasis indication 440a also displayed.

In the case of view 400a, if the user textual prompt received by the processor had been something similar to "Which is the best move for white to perform next?" the model would analyze the image and instead apply the emphasis indication at where it deems to be the best move for white to perform next, rather than any possible next move as requested in FIG. 4A.

In some embodiments, multiple emphasis indications can be applied to the image in order to form rich annotations. For example, in FIG. 4A, if the user textual prompt had been "Show me the top 5 chess moves for white on this board, but make sure to make it clear which is the best," multiple indications would be placed on image 410 which tell the user the top 5 possible moves the white chess pieces can perform, whilst clearly showing the best of the top 5 moves. In order to differentiate the best move emphasis indication from the others, the model may make said indication, for example, larger than the others, a bolder color, or may provide the best move emphasis indication with its own caption specifying its superiority.

FIG. 4B shows another example view 400b of another image 410b depicting several boats docked near a harbor. Image 410b may be displayed to a user via a GUI on a user device 140, for example, as described in step 210 of method 200. Again, item 420 may be an example interface of the GUI which a user can use to input a textual prompt. As for example described with reference to step 220 of method 200, such a textual prompt could be received by at least one processor. In the scenario of FIG. 4B, the textual prompt inputted by the user in item 420 may be "Where's the biggest boat?" The user textual prompt and image 410b may be used by the at least one processor to generate input data, as for example, described in step 230 of method 200.

In the case of view 400b, spatial encoding 430b may be applied to the image as part of the generation of input data by the at least one processor. In this scenario, spatial encoding 430b may be in the form of regular repeating gridlines. The at least one processor generates the output by applying the input data to the machine learning model of machine learning system 130, as for example, described in step 240 of method 200. In the case of view 400b, the model may be able to recognize, through the application of prompt engineering as described above in relation to step 240 of method 200, which of the boats depicted in image 410b may be the biggest. The output generated includes a location indication at the biggest of the boats depicted in image 410b, as well as a textual response from the model. In the case of view 400b, the location indication includes, for example, a set of coordinates within spatial encoding 430b. Emphasis indication 440b may be placed at the generated output comprising a location indication, as for example, described in step 250 of method 200. In the case of view 400b, the model or user has chosen a symbol of a hand with a pointing finger as the most appropriate emphasis indicator 440b. The textual response may be also displayed next to emphasis indication 440b at the indicated location in the form of a caption reading "Biggest boat". When the result may be shown to the user via the GUI, spatial encoding 430b may be included along with the image 410b with emphasis indication 440b also displayed.

FIG. 4C is yet another example view 400c of another image 410c depicting a puppy in front of a garden background. Image 410c may be displayed to a user via a GUI on a user device 140, for example, as described with reference to step 210 of method 200. Item 420 may be an example interface of the GUI which a user can use to input a textual prompt. As for example described with reference to step 220 of method 200, such a textual prompt could be received by at least one processor. In the scenario of 400c, the textual prompt inputted by the user at item 420 may be "Where are the red flowers?" The user textual prompt and image 410c may be used by the at least one processor to generate input data, as for example, described in step 230 of method 200.

In the case of view 400c, spatial encoding 430c may be applied to the image as part of the generation of the input data by the at least one processor. In this scenario spatial encoding 430c may be in the form of regular repeating gridlines. The at least one processor generates an output by applying the input data to the machine learning model of machine learning system 130, as for example, described in step 240 of method 200. In the case of view 400c, the model may be able to recognize, through the application of prompt engineering as described above in relation to step 240 of method 200, the location of the red flowers in image 410c. The output generated includes a location indication at the location of the red flowers in image 410c, as well as a textual response from the model. In the case of view 400c, the location indication includes, for example, a set of coordinates within spatial encoding 430c. Emphasis indication 440c may be placed at the generated location indication, as for example, described in step 250 of method 200. In the case of view 400c, the model or user has chosen a symbol of a magnifying glass as the most appropriate emphasis indicator 440c. The textual response may be also displayed next to emphasis indicator 440c in the form of a caption reading "Red flowers found behind puppy". When the result may be shown to the user via the GUI, spatial encoding 430c may be included along with the image 410c with emphasis indication 440c also displayed.

Figure 5A:
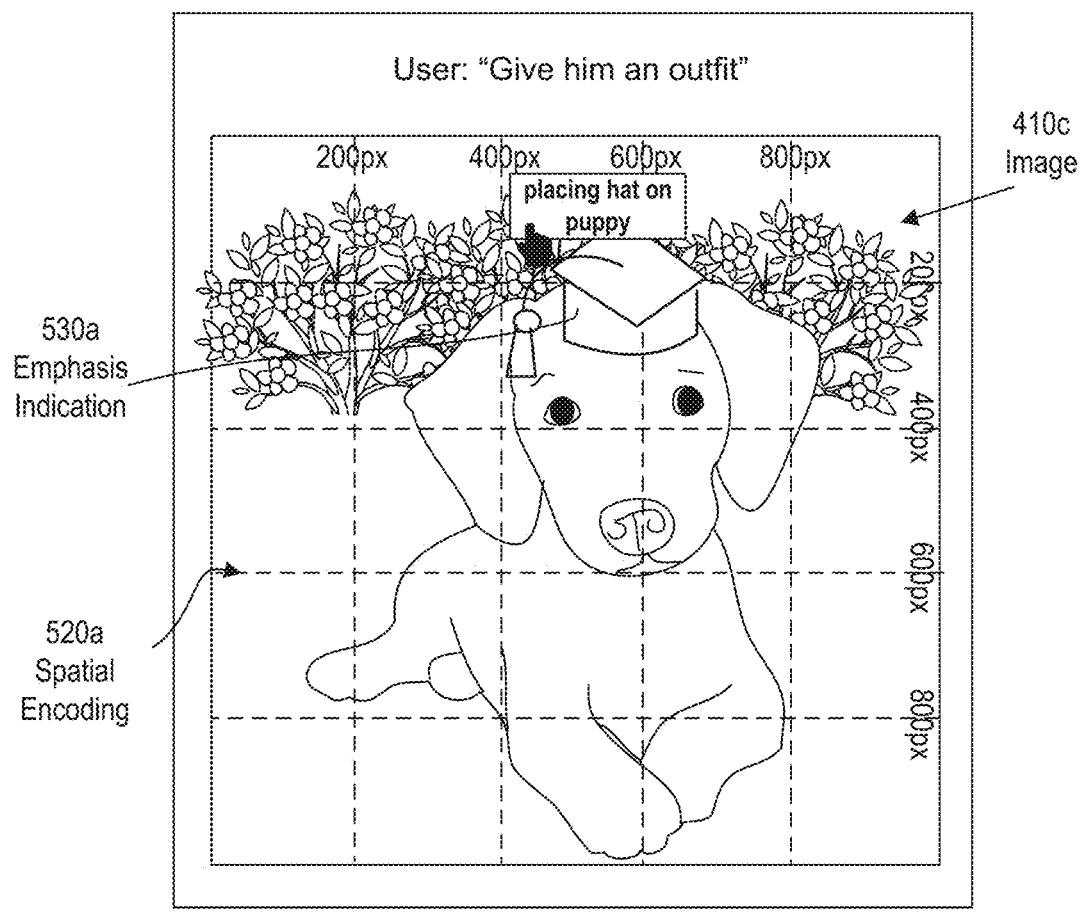
FIGS. 5A and 5B illustrate different types of emphasis indicators placed on an image following interaction with a machine learning model, according to some embodiments of the present disclosure.
Figure 5B:
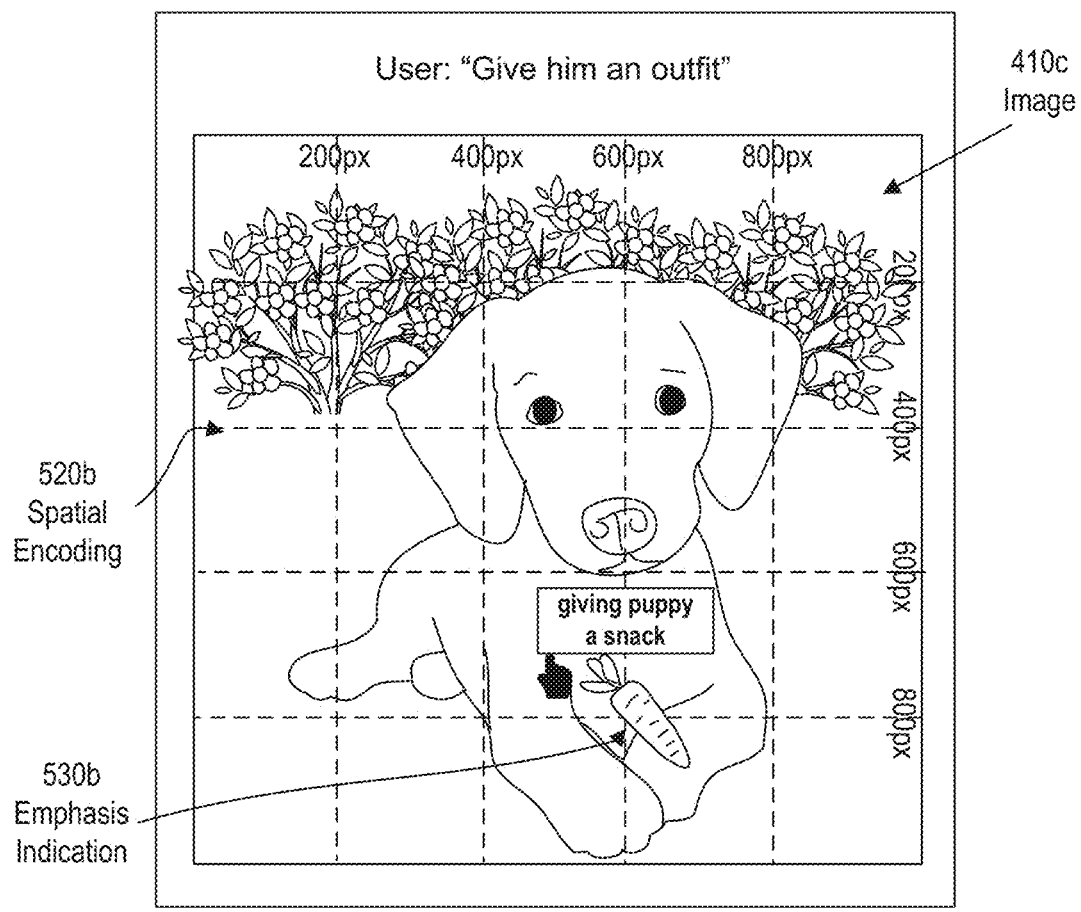

FIGS. 5A and 5B illustrate different types of emphasis indicators placed on an image following interaction with a machine learning model such as a multimodal LLM, according to some embodiments of the present disclosure.

FIG. 5A shows an example view 500a of image 410c, previously discussed in relation to FIG. 4C. In the case of 500a, the textual prompt inputted by the user, for example, as described in step 220 of method 200, may be "Give him an outfit". This textual prompt may be different to those illustrated in FIGS. 4A, 4B and 4C, where the user prompts took the form of questions which required the model to indicate on an image the location of a particular element, as requested by the user. The textual prompt of view 500a includes a display parameter. Through prompt engineering, the machine learning model of machine learning system 130 recognizes that the textual prompt asks it to display some type of clothing on the puppy depicted in image 410c. The user textual prompt and image 410c may be used by the at least one processor to generate input data, as for example, described in step 230 of method 200. In the case of view 500a, spatial encoding 520a may be applied to the image as part of the generation of input data by the at least one processor. In this scenario, spatial encoding 520a may be in the form of regular repeating gridlines. The at least one processor generates the output by applying the input data to the machine learning model, as for example, described in step 240 of method 200.

In the case of view 500a, the model may be also able to recognize, through the application of prompt engineering as described above in relation to step 240 of method 200, where on image 410c may be an appropriate place to apply clothing to the puppy. The output generated includes a location indication at a particular area of the puppy depicted in image 410c, as well as the display parameter from the textual prompt, and a textual response from the model. In the case of view 500a, the location indication includes, for example, a set of coordinates within spatial encoding 520a. Emphasis indication 530a may be placed at the generated location indication, as for example, described in step 250 of method 200. In the case of view 500a, the model has chosen, using prompt engineering as described above in relation to step 240 of method 200, an emphasis indicator 530a in the form of a hat, as this may be an appropriate representation given the prompt and the generated location indication. The textual response may be also displayed next to emphasis indication 530a at the indicated location in the form of a caption reading "Placing hat on puppy". When the result may be shown to the user via the GUI, spatial encoding 520a may be included along with the image 410*c* with emphasis indication 520*a* also displayed.

Similar to FIG. 5A, exemplary view FIG. 5B depicts a different kind of emphasis indicator to those shown in FIGS. 4A, 4B and 4C. FIG. 5B shows an example view 500*b* of image 410*c*, previously discussed in relation to FIG. 4C. In the case of 500*b*, the textual prompt inputted by the user, for example, as described in step 220 of method 200, directs the model to "Give him [the puppy] a snack". Again, this textual prompt may be different to those illustrated in FIGS. 4A, 4B and 4C, where the user prompts took the form of questions which required the model to indicate on an image the location of a particular element, as requested by the user. The textual prompt of view 500*b* includes an action parameter. Through prompt engineering, the machine learning model of machine learning system 130 recognizes that the textual prompt asks it to "feed" the puppy depicted in image 410*c* some sort of food. The user textual prompt and image 410*c* may be used by the at least one processor to generate input data, as for example, described in step 230 of method 200. In the case of view 500*b*, spatial encoding 520*b* may be applied to the image as part of the generation of input data by the at least one processor. In this scenario, spatial encoding 520*b* may be in the form of regular repeating gridlines. The at least one processor generates the output by applying the input data to the model, as for example, described in step 240 of method 200. In the case of view 500*b*, the model may be also able to recognize, through the application of prompt engineering as described above in relation to step 240 of method 200, the location on image 410*c* corresponding to the most appropriate area at which the puppy can be "fed". The output generated includes a location indication at this area, as well as the action parameter from the textual prompt, and a textual response from the model. In the case of view 500*b*, the location indication includes, for example, a set of coordinates within spatial encoding 520*b*.

Emphasis indication 530*b* may be placed at the generated location indication, as for example, described in step 250 of method 200. In the case of view 500*b*, the model has chosen, using prompt engineering as described above in relation to step 240 of method 200, an emphasis indicator 530*b* in the form of a carrot, as this may be appropriate given the action parameter of the textual prompt asking to "feed" the puppy. The textual response is also displayed next to emphasis indication 530*b* at the indicated location in the form of a caption reading "Giving puppy a snack". When the result is shown to the user via the GUI, spatial encoding 520*b* may be included along with the image 410*c* with emphasis indication 530*b* also displayed.

Figure 6:
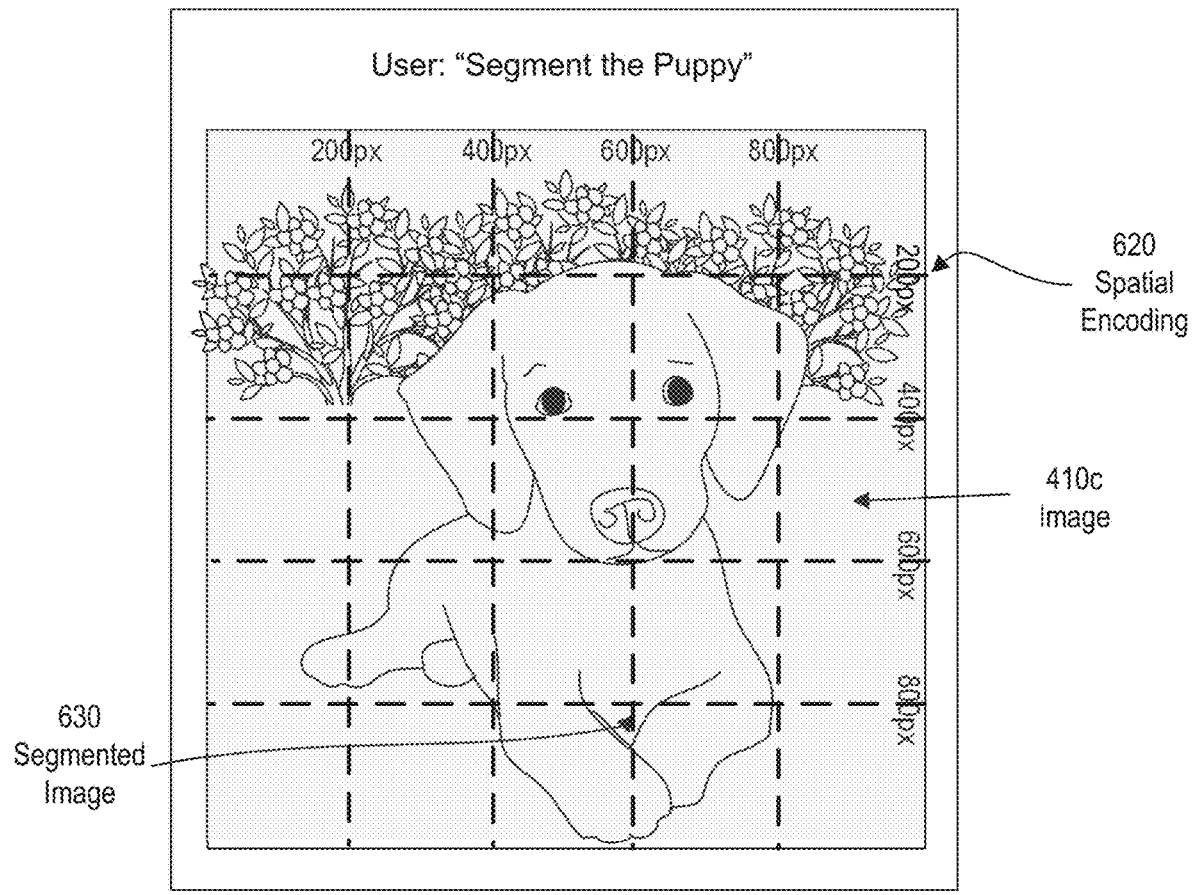
FIG. 6 illustrates an example of image segmentation, according to some embodiments of the present disclosure.

FIG. 6 illustrates image segmentation performed on a particular object within an image following a prompt from a user, according to some embodiments of the present disclosure.

FIG. 6 show an example view 600 of image 410*c*, previously discussed in relation to FIG. 4C. In the case of 600, the textual prompt inputted by the user as, for example, described in step 220 of method 200, may be "Segment the puppy". This textual prompt includes an action parameter. Through prompt engineering, the machine learning model of machine learning system 130 recognizes that the textual prompt asks it to separate the puppy from the rest of the image. The user textual prompt and image 410*c* may be used by the at least once processor to generate input data as, for example, described in step 230 of method 200. In the case of view 600, spatial encoding 620 may be applied to the image as part of the generation of input data by the at least one processor. In this scenario, spatial encoding 620 may be in the form of regular repeating gridlines. The at least one processor generates the output by applying the input data to the model, as for example, described in step 240 of method 200.

The output may include includes a location indication encompassing the whole puppy itself. In the case of view 600, the at least one processor further generates an image segment encompassing the location indication, i.e., the entire puppy, by applying image 410*c* to a segmentation model of image processing system 120, as for example, described in relation to step 240 of method 200. Emphasis indication 630 may be encompasses the segmented puppy, where the puppy itself it outlined within image 410*c* and faded in color, as for example, described in step 250 of method 200. In the case of view 600, the model, using prompt engineering as described above in relation to step 240 of method 200, has recognized that the puppy itself must be isolated from the rest of the image and has, for example, worked in combination with a segmentation model of image processing system 120 to perform the segmentation. In some embodiments, the outlining of segmented objects in an image can be indicated with additional emphasis in the form of blurring, fading, desaturation, or other such photo effects. When the result is shown to the user via the GUI, spatial encoding 620 may be included along with the image 410*c* with emphasis indication 630 in the form of the segmented puppy also displayed.

Figure 7A:
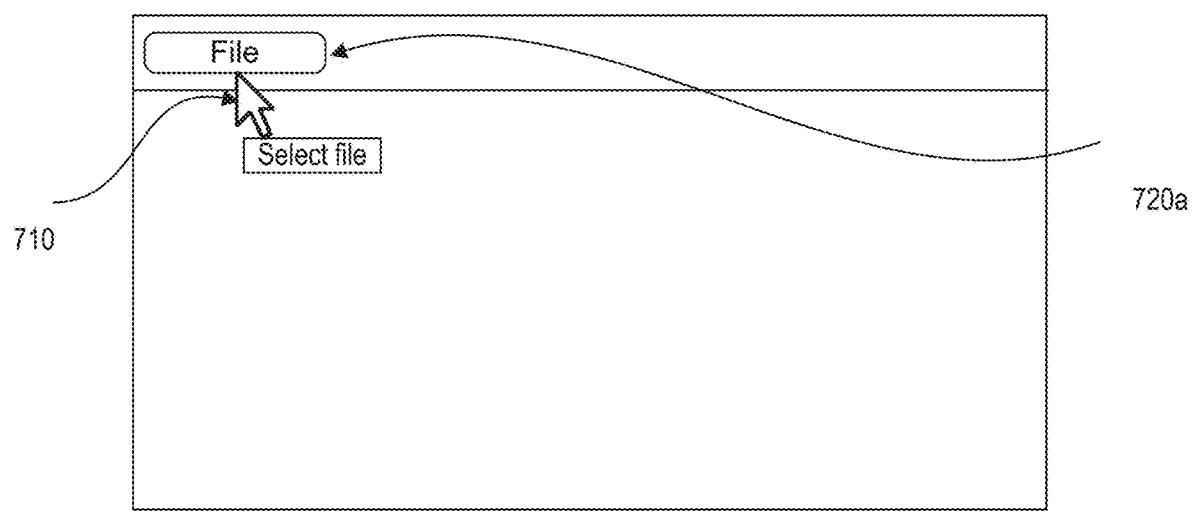
FIGS. 7A and 7B illustrate an example of a machine learning model saving a document once prompted, according to some embodiments of the present disclosure.
Figure 7B:
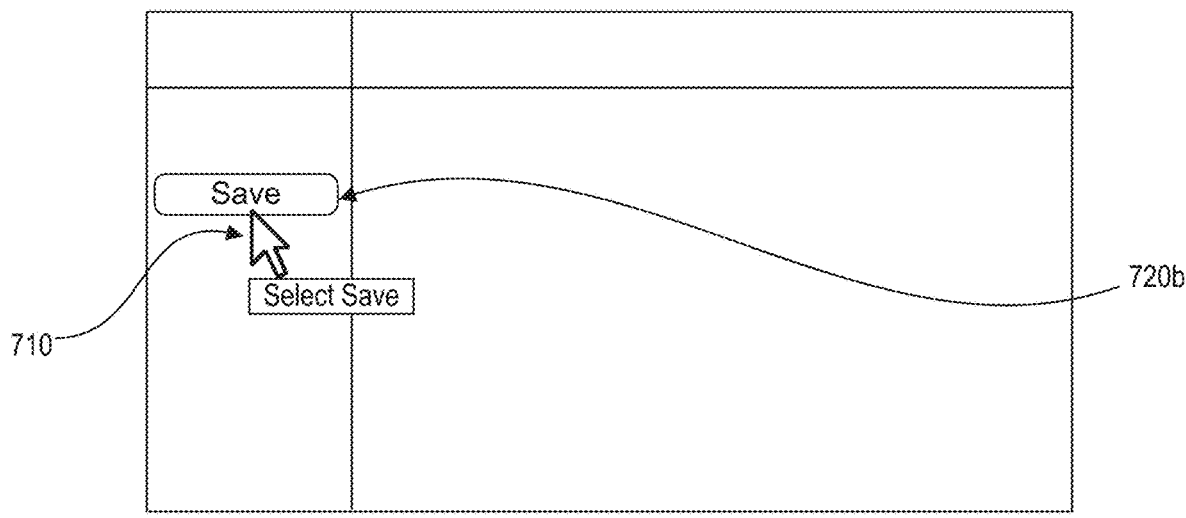

FIGS. 7A and 7B depict the machine learning model such as a multimodal LLM carrying out a specific task within the GUI following a textual prompt from the user, according to some embodiments of the present disclosure.

FIGS. 7A and 7B show example views 700*a* and 700*b* depicting the same GUI found on user device 140. The textual prompt inputted by the user, for example as described in step 220 of method 200, asks to "Please save this document". This textual prompt includes an action parameter specifying an action within the GUI itself. This user prompt asks for the document currently displayed within the GUI to be saved. In order to carry out the prompt, the at least one processor generates an input data using the prompt and a snapshot of the GUI, as for example, described in step 230 of method 200. The model, using prompt engineering, may be able to recognize that the textual prompt of the user asks for this action to be carried out within the GUI itself. The at least one processor generates the output by applying the input data to the machine learning model of machine learning system 130, as for example, described in step 240 of method 200. The output includes the location indication as well as the action parameter from the prompt. In the case of views 700*a* and 700*b*, displaying the emphasis indicator at the location indication includes the at least one processor placing a cursor of the GUI 710 at the "File" button 720*a*, as shown in view 700*a* and, as for example, described in step 250 of method 200, and then performing the action of saving the document by selecting the "File" button 720*a* and then placing cursor 710 at the "Save" button 720*b* within the now opened menu, as shown in view 700*b* and as, for example, described in step 250 of method 200, and then selecting the "Save" button 720*b*, as per the textual prompt. This embodiment allows a user unfamiliar with the GUI to carry out important tasks, such as saving a document, via the model without having to go through the trouble of learning how to do it themselves.

Figure 8:
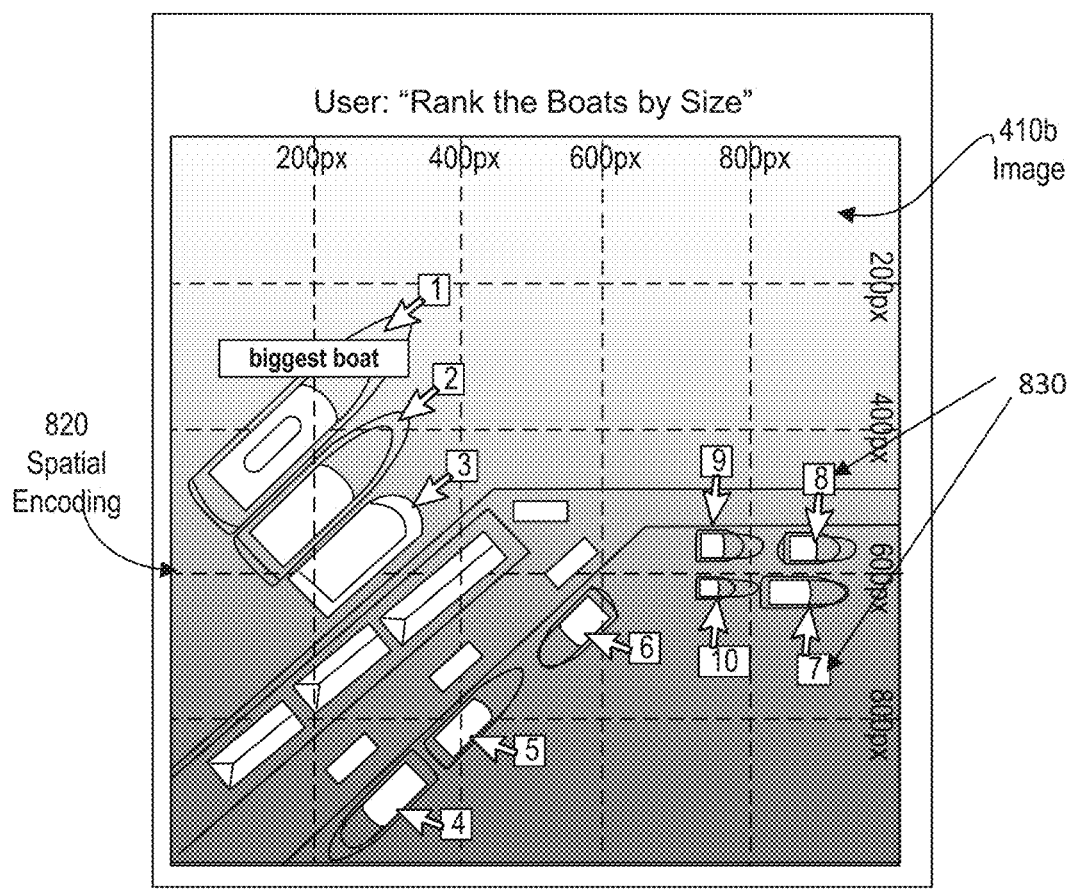
FIG. 8 illustrates multiple emphasis locations at multiple location indications on an image, according to some embodiments of the present disclosure.

FIG. 8 illustrates multiple emphasis locations at multiple location indications placed on an image, according to some embodiments of the present disclosure.

FIG. 8 shows an example view 800 of image 410b, previously discussed in relation to FIG. 4B. In the case of view 800, the textual prompt inputted by the user, for example, as described in step 220 of method 200, asks the model to "Rank the boats by size". The machine learning model of machine learning system 130 recognizes, using prompt engineering as described above in relation to step 240 of method 200, that this prompt asks for the several boats depicted in image 410b to be given a size-based ranking. The textual prompt and image 410b may be used by the at least one processor to generate input data, as for example, described in step 230 of method 200. In the case of view 800, spatial encoding 820 may be applied to the image as part of the generation of input data by the at least one processor. In this scenario, spatial encoding 820 may be in the form of regular repeating gridlines. The at least one processor generates the output by applying the input data to the multimodal LLM, as for example, described in step 240 of method 200. In the case of view 800, the output comprises multiple location indications, where each location indication includes, for example, a set of coordinates within spatial encoding 820.

In some embodiments, the model may be able to determine, using prompt engineering as described above in relation to step 240 of method 200, which ranking to give each boat in the image, based on their size. Emphasis indications 830 may be placed at each of the multiple location indications, as for example, described in step 250 of method 200. In the case of view 800, the model has chosen the emphasis indications 830 to be in the form of numbers corresponding to rank. When the result is shown to the user via the GUI, spatial encoding 820 may be included along with the image 410b with emphasis indications 830 applied.

Figure 9:
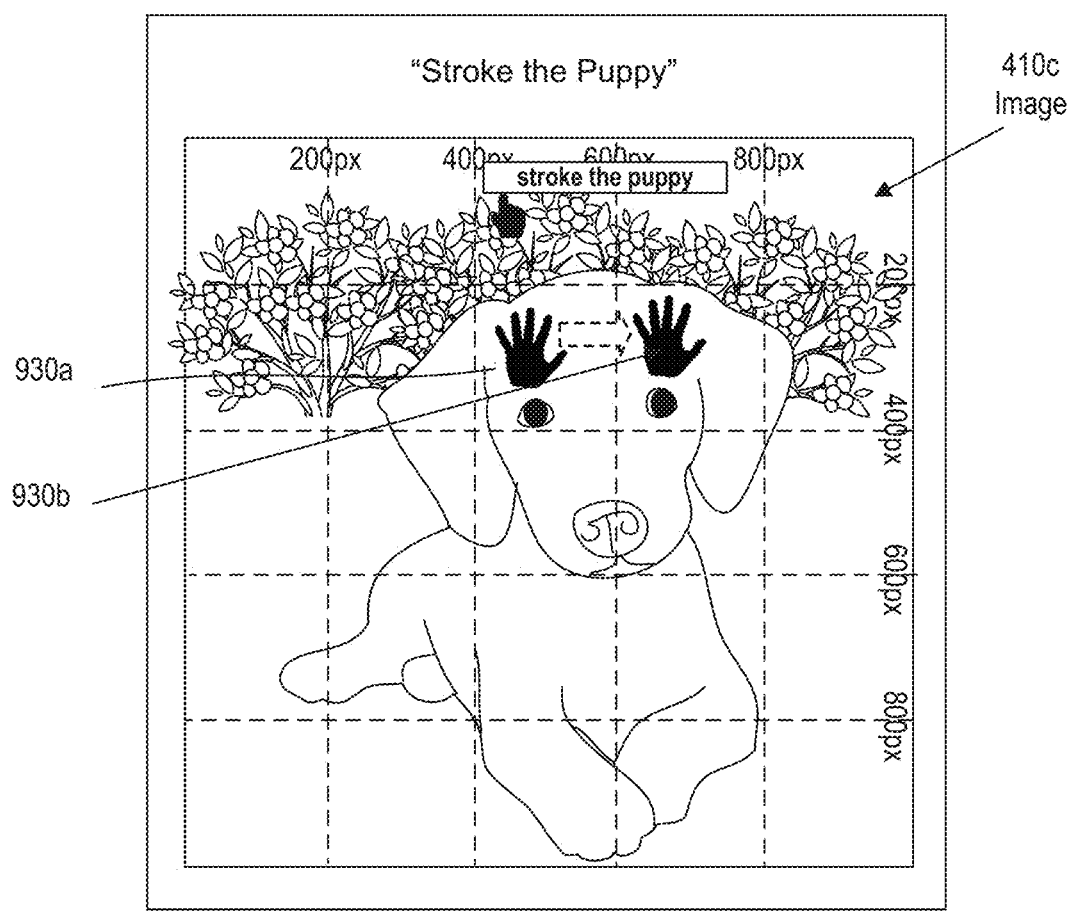
FIG. 9 illustrates a sequence of emphasis locations at location indications on an image, according to some embodiments of the present disclosure.

FIG. 9 illustrates a sequence of emphasis locations at location indications on an image, according to some embodiments of the present disclosure.

FIG. 9 shows an example view 900 of image 410c, previously discussed in relation to FIG. 4C. In the case of 900, the textual prompt inputted by the user, in the ways described in step 220 of method 200, directs the model to "Stroke the puppy". This prompt includes an action parameter, as the user asks the perform the action of "stroking" the puppy in image 410c. Through prompt engineering, the machine learning model of machine learning system 130 recognizes that the textual prompt asks it to "stroke" the puppy. The user textual prompt and image 410c may be used by the at least one processor to generate input data, as for example, described in step 230 of method 200. In the case of view 900, spatial encoding 920 may be applied to the image as part of the generation of input data by the at least one processor. In this scenario, spatial encoding 920 may be in the form of regular repeating gridlines. The at least one processor generates the output by applying the input data to the model, as for example described in step 240 of method 200. In the case of view 900, the model may be able to determine, using prompt engineering as described above in relation to step 240 of method 200, the location on image 410c corresponding to an appropriate area at which the puppy can be "stroked". The output generated includes a sequence of locations indications, as well as the action parameter from the textual prompt. In the case of view 900, each of the location indications in the sequence includes, for example, a set of coordinates within spatial encoding 920. Emphasis indicators 930a and 930b may be displayed sequentially, with 930a show initially and 930b shown afterwards.

When the result is shown to the user via the GUI, as for example described in step 250 of method 200, emphasis indications 930a and 930b can be shown in a repeating sequence so as to replicate motion. The user will view this as the model actively stroking the puppy on the head. In the case of view 900, the model has chosen, using prompt engineering, a symbol of a hand as the most appropriate emphasis indicators. When the result is shown to the user via the GUI, the spatial encoding 930 may be included along with image 410c and emphasis indications 930a and 930b. In some embodiments, sequential emphasis indications such as those described in relation to FIG. 9 can be displayed to the user in the form of an animation, GIF, video, or other such motion-based media.

Figure 10:
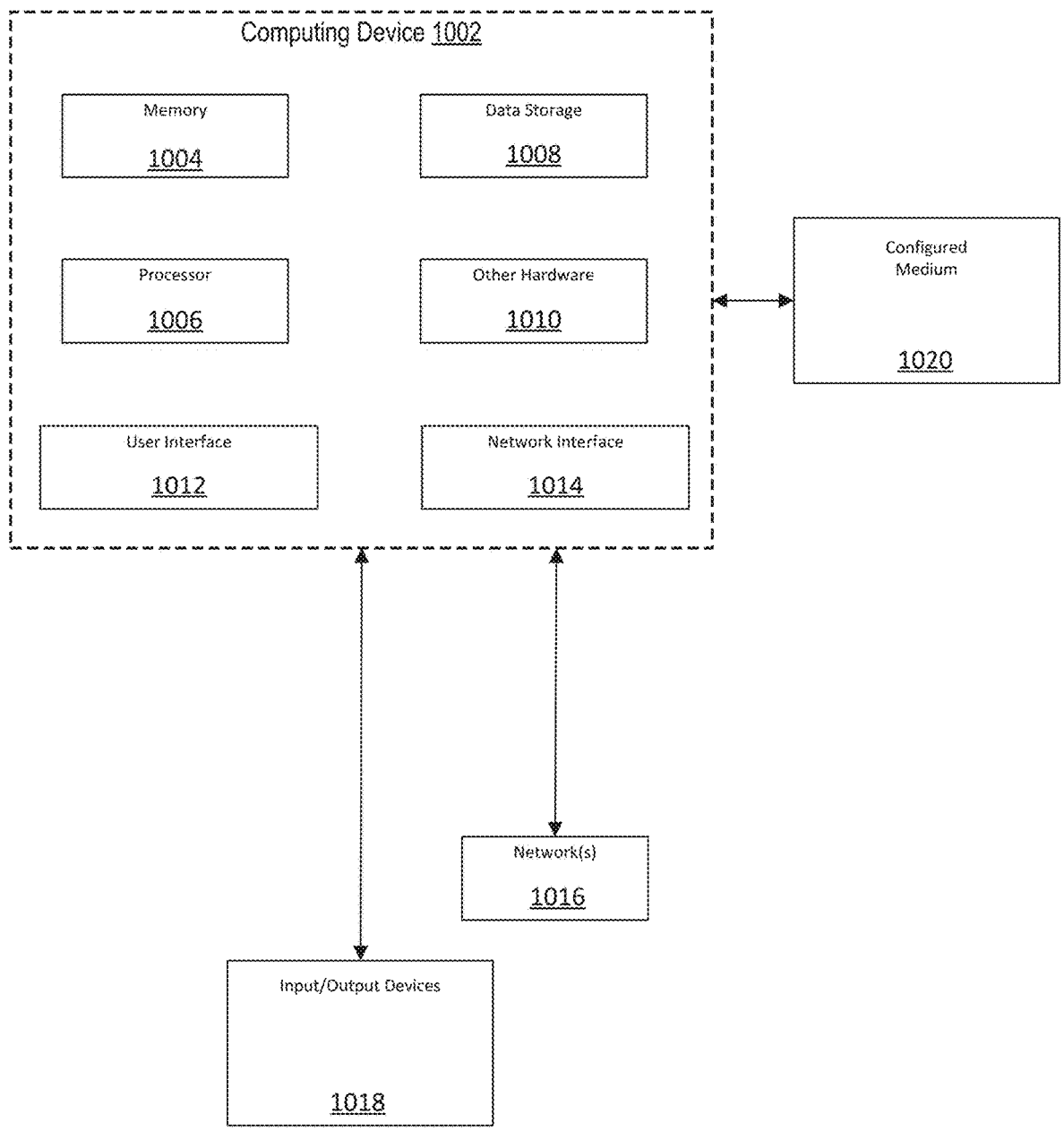
FIG. 10 is a block diagram illustrating an exemplary operating environment for implementing various aspects of this disclosure, according to some embodiments of the present disclosure.

FIG. 10 is a block diagram illustrating an exemplary operating environment for implementing various aspects of this disclosure, according to some embodiments of the present disclosure. As illustrated in FIG. 10, an exemplary operating environment 1000 may include a computing device 1002 (e.g., a general-purpose computing device) in the form of a computer. In some embodiments, computing device 1002 may be associated with a user. Components of the computing device 1002 may include, but are not limited to, various hardware components, such as one or more processors 1006, data storage 1008, a system memory 1004, other hardware 1010, and a system bus (not shown) that couples (e.g., communicably couples, physically couples, and/or electrically couples) various system components such that the components may transmit data to and from one another. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

With further reference to FIG. 10, operating environment 1000 for an exemplary embodiment includes at least one computing device 1002. Computing device 1002 may be a uniprocessor or multiprocessor computing device. An operating environment 1000 may include one or more computing devices (e.g., multiple computing devices 1002) in a given computer system, which may be clustered, part of a local area network (LAN), part of a wide area network (WAN), client-server networked, peer-to-peer networked within a cloud, or otherwise communicably linked. A computer system may include an individual machine or a group of cooperating machines. A given computing device 1002 may be configured for end-users, e.g., with applications, for administrators, as a server, as a distributed processing node, as a special-purpose processing device, or otherwise configured to train machine learning models and/or use machine learning models.

One or more users may interact with the computer system comprising one or more computing devices 1002 by using a display, keyboard, mouse, microphone, touchpad, camera, sensor (e.g., touch sensor) and other input/output devices 1018, via typed text, touch, voice, movement, computer vision, gestures, and/or other forms of input/output. An input/output device 1018 may be removable (e.g., a connectable mouse or keyboard) or may be an integral part of the computing device 1002 (e.g., a touchscreen, a built-in microphone). A user interface 1012 may support interaction between an embodiment and one or more users. User interface 1012 may include one or more of a command line interface, a graphical user interface (GUI), natural user interface (NUI), voice command interface, and/or other user interface (UI) presentations, which may be presented as distinct options or may be integrated. A user may enter commands and information through a user interface or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other NUI may also be used with the appropriate input devices, such as a microphone, camera, tablet, touch pad, glove, or other sensor. These and other input devices are often connected to the processing units through a user input interface that is coupled to the system bus, but may be connected by other interface and bus structures, such as a parallel port, game port or a universal serial bus (USB). A monitor or other type of display device is also connected to the system bus via an interface, such as a video interface. The monitor may also be integrated with a touch-screen panel or the like. Note that the monitor and/or touch screen panel can be physically coupled to a housing in which the computing device is incorporated, such as in a tablet-type personal computer. In addition, computers such as the computing device may also include other peripheral output devices such as speakers and printer, which may be connected through an output peripheral interface or the like.

One or more application programming interface (API) calls may be made between input/output devices 1018 and computing device 1002, based on input received from at user interface 1012 and/or from network(s) 1016. As used throughout, "based on" may refer to being established or founded upon a use of, changed by, influenced by, caused by, or otherwise derived from. In some embodiments, an API call may be configured for a particular API, and may be interpreted and/or translated to an API call configured for a different API. As used herein, an API may refer to a defined (e.g., according to an API specification) interface or connection between computers or between computer programs.

System administrators, network administrators, software developers, engineers, and end-users are each a particular type of user. Automated agents, scripts, playback software, and the like acting on behalf of one or more people may also constitute a user. Storage devices and/or networking devices may be considered peripheral equipment in some embodiments and part of a system comprising one or more computing devices 1002 in other embodiments, depending on their detachability from the processor(s) 1006. Other computerized devices and/or systems not shown in FIG. 1 may interact in technological ways with computing device 1002 or with another system using one or more connections to a network 1016 via a network interface 1014, which may include network interface equipment, such as a physical network interface controller (NIC) or a virtual network interface (VIF).

Computing device 1002 includes at least one logical processor 1006. Computing device 1002, like other suitable devices, also includes one or more computer-readable storage media, which may include, but are not limited to, memory 1004 and data storage 1008. In some embodiments, memory 1004 and data storage 1008 may be part a single memory component. The one or more computer-readable storage media may be of different physical types. The media may be volatile memory, non-volatile memory, fixed in place media, removable media, magnetic media, optical media, solid-state media, and/or of other types of physical durable storage media (as opposed to merely a propagated signal). In particular, a configured medium 1020 such as a portable (i.e., external) hard drive, compact disc (CD), Digital Versatile Disc (DVD), memory stick, or other removable non-volatile memory medium may become functionally a technological part of the computer system when inserted or otherwise installed with respect to one or more computing devices 1002, making its content accessible for interaction with and use by processor(s) 1006. The removable configured medium 1020 is an example of a computer-readable storage medium. Some other examples of computer-readable storage media include built-in random access memory (RAM), read-only memory (ROM), hard disks, and other memory storage devices which are not readily removable by users (e.g., memory 1004).

Configured medium 1020 may be configured with instructions (e.g., binary instructions) that are executable by a processor 1006. The term "executable" is used herein in a broad sense to include machine code, interpretable code, bytecode, compiled code, and/or any other code that is configured to run on a machine, including a physical machine or a virtualized computing instance (e.g., a virtual machine or a container). Configured medium 1020 may also be configured with data which is created by, modified by, referenced by, and/or otherwise used for technical effect by execution of the instructions. The instructions and the data may configure the memory or other storage medium in which they reside; such that when that memory or other computer-readable storage medium is a functional part of a given computing device, the instructions and data may also configure that computing device.

Although an embodiment may be described as being implemented as software instructions executed by one or more processors in a computing device (e.g., general-purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include other hardware logic components 1010 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processor(s) 1006 (e.g., one or more CPUs, ALUs, FPUs, and/or GPUs), memory 1004, data storage 1008, and screens/displays, operating environment 1000 may also include other hardware 1010, such as batteries, buses, power supplies, wired and wireless network interface cards, for instance. The nouns "screen" and "display" are used interchangeably herein. A display may include one or more touch screens, screens responsive to input from a pen or tablet, or screens which operate solely for output. In some embodiment, other input/output devices 1018 such as human user input/output devices (screen, keyboard, mouse, tablet, microphone, speaker, motion sensor, etc.) will be present in operable communication with one or more processors 1006 and memory.

In some embodiments, the system includes multiple computing devices 1002 connected by network(s) 1016. Networking interface equipment can provide access to network(s) 1016, using components (which may be part of a network interface 1014) such as a packet-switched network interface card, a wireless transceiver, or a telephone network interface, for example, which may be present in a given computer system. However, an embodiment may also communicate technical data and/or technical instructions through direct memory access, removable non-volatile media, or other information storage-retrieval and/or transmission approaches.

Computing device 1002 may operate in a networked or cloud-computing environment using logical connections to one or more remote devices (e.g., using network(s) 1016), such as a remote computer (e.g., another computing device 1002). The remote computer may include one or more of a personal computer, a server, a router, a network PC, or a peer device or other common network node, and may include any or all of the elements described above relative to the computer. The logical connections may include one or more LANs, WANs, and/or the Internet.

When used in a networked or cloud-computing environment, computing device 1002 may be connected to a public or private network through a network interface or adapter. In some embodiments, a modem or other communication connection device may be used for establishing communications over the network. The modem, which may be internal or external, may be connected to the system bus via a network interface or other appropriate mechanism. A wireless networking component such as one comprising an interface and antenna may be coupled through a suitable device such as an access point or peer computer to a network. In a networked environment, program modules depicted relative to the computer, or portions thereof, may be stored in the remote memory storage device. It may be appreciated that the network connections shown are exemplary and other means of establishing a communications link between the computers may be used.

Computing device 1002 typically may include any of a variety of computer-readable media. Computer-readable media may be any available media that can be accessed by the computer and includes both volatile and nonvolatile media, and removable and non-removable media, but excludes propagated signals. By way of example, and not limitation, computer-readable media may include computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, electrically erasable programmable read-only memory (EEPROM), flash memory or other memory technology, CD-ROM, DVD or other optical disk storage, magnetic cassettes, magnetic tape, magnetic disk storage or other magnetic storage devices, or any other medium which can be used to store the desired information (e.g., program modules, data for a machine learning model, and/or a machine learning model itself) and which can be accessed by the computer. Communication media may embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of the any of the above may also be included within the scope of computer-readable media. Computer-readable media may be embodied as a computer program product, such as software (e.g., including program modules) stored on non-transitory computer-readable storage media.

Data storage 1008 or system memory includes computer storage media in the form of volatile and/or nonvolatile memory such as ROM and RAM. A basic input/output system (BIOS), containing the basic routines that help to transfer information between elements within computer, such as during start-up, may be stored in ROM. RAM may contain data and/or program modules that are immediately accessible to and/or presently being operated on by processing unit. By way of example, and not limitation, data storage holds an operating system, application programs, and other program modules and program data.

Data storage 1008 may also include other removable/non-removable, volatile/nonvolatile computer storage media. By way of example only, data storage may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

Exemplary disclosed embodiments include systems, methods, and computer-readable media for the generation of text and/or code embeddings. For example, in some embodiments, and as illustrated in FIG. 10, operating environment 1000 may include at least one computing device 1002, at least one computing device 1002 including at least one processor 1006, at least one memory 1004, at least one data storage 1008, and/or any other component discussed in the present disclosure, such as with respect to FIG. 10.

Figure 11:
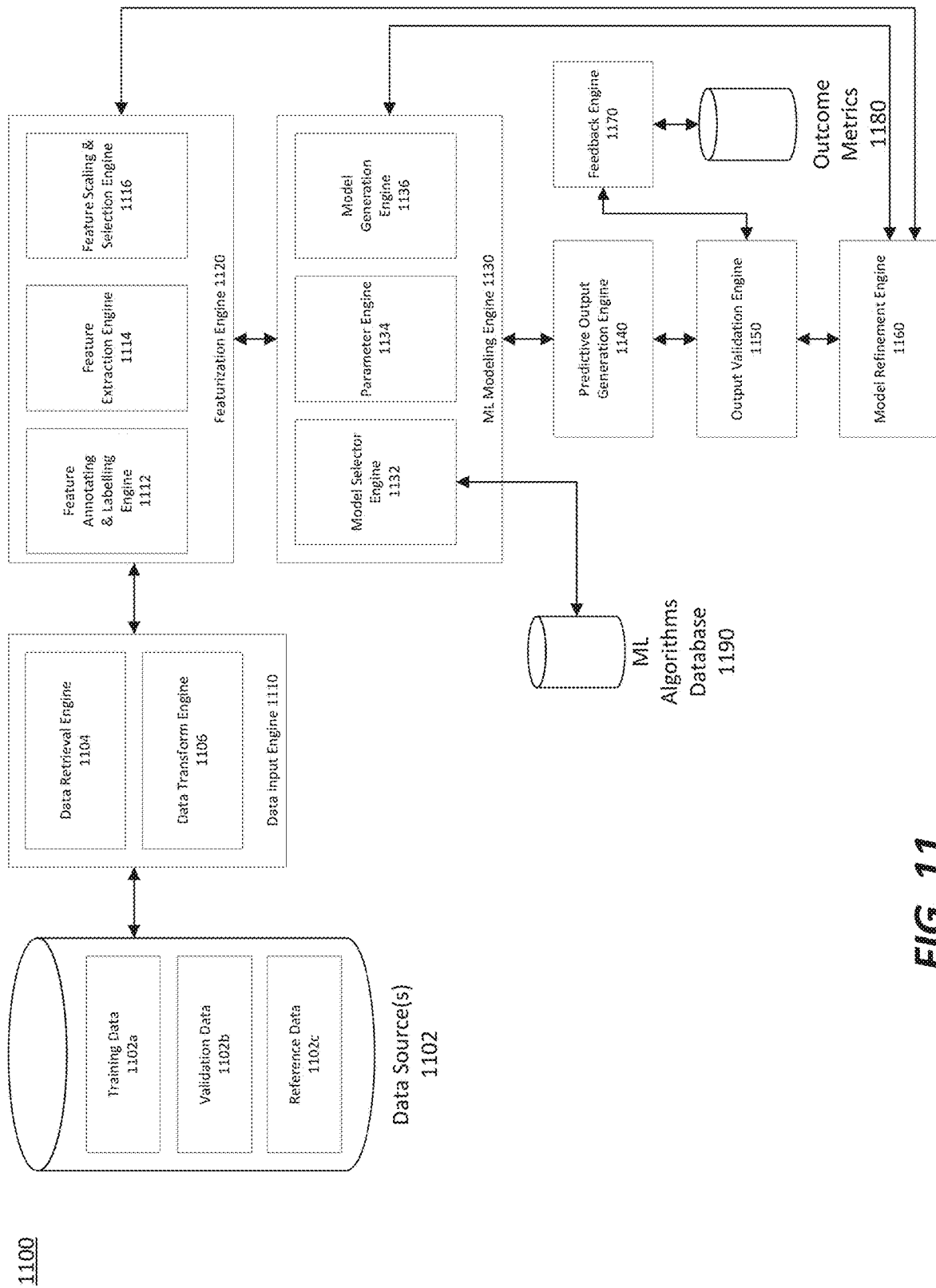
FIG. 11 is a block diagram illustrating an exemplary machine learning platform for implementing various aspects of this disclosure, according to some embodiments of the present disclosure.

FIG. 11 is a block diagram illustrating an exemplary machine learning platform for implementing various aspects of this disclosure, according to some embodiments of the present disclosure.

System 1100 may include data input engine 1110 that can further include data retrieval engine 1104 and data transform engine 1106. Data input engine 1110 may be configured to access, interpret, request, format, re-format, or receive input data from data source(s) 1102. Data source(s) 1102 may include one or more of training data 1102*a* (e.g., input data to feed a machine learning model as part of one or more training processes), validation data 1102*b* (e.g., data against which at least one processor may compare model output with, such as to determine model output quality), and/or reference data 1102*c*. In some embodiments, data input engine 1110 can be implemented using at least one computing device (e.g., computing device 1002). For example, data from data sources 1102 can be obtained through one or more I/O devices and/or network interfaces. Further, the data may be stored (e.g., during execution of one or more operations) in a suitable storage or system memory. Data input engine 1110 may also be configured to interact with data storage 1008, which may be implemented on a computing device that stores data in storage or system memory. System 1100 may include featurization engine 1120. Featurization engine 1120 may include feature annotating & labeling engine 1112 (e.g., configured to annotate or label features from a model or data, which may be extracted by feature extraction engine 1114), feature extraction engine 1114 (e.g., configured to extract one or more features from a model or data), and/or feature scaling and selection engine 1116. System 1100 may also include machine learning (ML) modeling engine 1130, which may be configured to execute one or more operations on a machine learning model (e.g., model training, model re-configuration, model validation, model testing), such as those described in the processes described herein. For example, ML modeling engine 1130 may execute an operation to train a machine learning model, such as adding, removing, or modifying a model parameter. Training of a machine learning model may be supervised, semi-supervised, or unsupervised. Data into to a model to train the model may include input data (e.g., as described above) and/or data previously output from a model (e.g., forming recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. ML modeling engine 1130 may include model selector engine 1132 (e.g., configured to select a model from among a plurality of models, such as based on input data), parameter selector engine 1134 (e.g., configured to add, remove, and/or change one or more parameters of a model), and/or model generation engine 1136 (e.g., configured to generate one or more machine learning models, such as according to model input data, model output data, comparison data, and/or validation data). Similar to data input engine 1110, featurization engine 1120 can be implemented on a computing device. In some embodiments, model selector engine 1132 may be configured to receive input and/or transmit output to ML algorithms database 1190 (e.g., a data storage 1008). Similarly, featurization engine 1120 can utilize storage or system memory for storing data and can utilize one or more I/O devices or network interfaces for transmitting or receiving data. ML algorithms database 1190 (or other data storage 1008) may store one or more machine learning models, any of which may be fully trained, partially trained, or untrained. A machine learning model may be or include, without limitation, one or more of (e.g., such as in the case of a metamodel) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a Proximal Policy Optimization (PPO) model, a nearest neighbor model, a linear regression model, a k-means clustering model, a Q-Learning model, a Temporal Difference (TD) model, a Deep Adversarial Network model, or any other type of model described further herein.

System 1100 can further include predictive output generation engine 1140, output validation engine 1150 (e.g., configured to apply validation data to machine learning model output), feedback engine 1170 (e.g., configured to apply feedback from a user and/or machine to a model), and model refinement engine 1160 (e.g., configured to update or re-configure a model). In some embodiments, feedback engine 1170 may receive input and/or transmit output to outcome metrics database 1180. In some embodiments, model refinement engine 1160 may receive output from predictive output generation engine 1140 or output validation engine 1150. In some embodiments, model refinement engine 1160 may transmit the received output to featurization engine 1120 or ML modeling engine 1130 in one or more iterative cycles.

Any or each engine of system 1100 may be a module (e.g., a program module), which may be a packaged functional hardware unit designed for use with other components or a part of a program that performs a particular function (e.g., of related functions). Any or each of these modules may be implemented using a computing device. In some embodiments, the functionality of system 1100 may be split across multiple computing devices to allow for distributed processing of the data, which may improve output speed and reduce computational load on individual devices. In these or other embodiments, the different components may communicate over one or more I/O devices and/or network interfaces.

System 1100 can be related to different domains or fields of use. Descriptions of embodiments related to specific domains, such as natural language processing or language modeling, is not intended to limit the disclosed embodiments to those specific domains, and embodiments consistent with the present disclosure can apply to any domain that utilizes predictive modeling based on available data.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct one or more hardware processors of a computer, other programmable data processing apparatus, or other devices to function in a particular manner, such that the instructions stored in the computer-readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed (e.g., executed) on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer-readable medium(s) may be utilized. The computer-readable medium may be a non-transitory computer-readable storage medium. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber cable, RF, IR, etc., or any suitable combination of the foregoing.

Computer program code for carrying out operations, for example, embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A computer-implemented method comprising:
receiving a prompt associated with a graphical user interface (GUI);
generating input data using a snapshot of the GUI and the prompt, the input data generated in a format usable by a machine learning model, wherein generating input data comprises:
tokenizing the snapshot of the GUI and the prompt to generate a tokenized snapshot of the GUI and a tokenized prompt; and
concatenating the tokenized snapshot of the GUI and the tokenized prompt into a singular tokenized input;
generating an output by applying the input data to the machine learning model, the machine learning model being configured to identify a location in the GUI based on the prompt, the output comprising a location indication within the GUI; and
generating instructions to display a cursor at the location in the GUI.

2. The method of claim 1, wherein the prompt is a textual prompt.

3. The method of claim 1, wherein:
the location is associated with a GUI element, the GUI element being a selectable button; and
the method further comprises using the machine learning model to activate the cursor to select the button within the GUI.

4. The method of claim 2, wherein the textual prompt includes an action parameter, wherein the action parameter specifies an action within the GUI.

5. The method of claim 4, wherein the machine learning model is configured using prompt engineering to identify the action parameter.

6. The method of claim 1, wherein:
the location is associated with a GUI element, the GUI element being a clickable element; and
the method further comprises using the machine learning model to activate the cursor to select the clickable element within the GUI.

7. The method of claim 1, wherein generating the input data further comprises combining the snapshot of the GUI with a spatial encoding.

8. The method of claim 7, wherein the location indication comprises coordinates within the spatial encoding or a token corresponding to coordinates within the spatial encoding.

9. The method of claim 1, wherein:
the output comprises a second location indication within the GUI;
the method further comprises generating instructions to display a second cursor at the second location in the GUI, wherein the second location is associated with a second GUI element, the second GUI element being a selectable element; and
activating, using the machine learning model, the second cursor to select the selectable element at the second location within the GUI.

10. A system, comprising:
at least one processor; and
at least one memory containing instructions that, when executed by the at least one processor, cause the system to perform operations comprising:
receiving a prompt associated with a graphical user interface (GUI);

generating input data using a snapshot of the GUI, the input data generated in a format usable by a machine learning model, wherein generating input data comprises:
   tokenizing the snapshot of the GUI and the prompt to generate a tokenized snapshot of the GUI and a tokenized prompt; and
   concatenating the tokenized snapshot of the GUI and the tokenized prompt into a singular tokenized input;
generating an output by applying the input data to the machine learning model, the machine learning model being configured to identify a location in the GUI based on the prompt, the output comprising a location indication; and
generating instructions to display an indicator at the location.

11. The system of claim 10, wherein the prompt is a textual prompt.

12. The system of claim 10, wherein:
   the location is associated with a GUI element, the GUI element being a selectable button; and
   the operations further comprise using the machine learning model to activate a cursor to select the button within the GUI.

13. The system of claim 11, wherein the textual prompt includes an action parameter, wherein the action parameter specifies an action within the GUI.

14. The system of claim 13, wherein the machine learning model is configured using prompt engineering to identify the action parameter.

15. The system of claim 10, wherein:
   the location is associated with a GUI element, the GUI element being a clickable element; and
   the operations further comprise using the machine learning model to activate a cursor to select the clickable element with the GUI.

16. The system of claim 10, wherein generating the input data further comprises combining the snapshot of the GUI with a spatial encoding.

17. The system of claim 16, wherein the location indication comprises coordinates within the spatial encoding or a token corresponding to coordinates within the spatial encoding.

18. The system of claim 10, wherein:
   the output comprises a second location indication;
   the operations further comprise generating instructions to display a cursor at the second location, wherein the second location is associated with a second GUI element, the second GUI element being a selectable button; and
   activating, using the machine learning model, the cursor to select the selectable button at the second location within the GUI.

19. A machine learning system comprising:
one or more memory devices storing instructions; and
one or more processors coupled to the one or more memory devices and configured to:
receive a prompt associated with a graphical user interface (GUI);
generate input data using a snapshot of the GUI, the input data generated in a format usable by a machine learning model, wherein generating input data comprises:
   tokenizing the snapshot of the GUI and the prompt to generate a tokenized snapshot of the GUI and a tokenized prompt; and
   concatenating the tokenized snapshot of the GUI and the tokenized prompt into a singular tokenized input;
generating an output by applying the input data to the machine learning model, the machine learning model being configured to identify a location in the GUI based on the prompt, the output comprising a location indication; and
generating instructions to display an indicator at the location.

20. The machine learning system of claim 19, wherein:
the location is associated with a GUI element, the GUI element being a selectable button; and
   the one or more processors are configured to use the machine learning model to activate the cursor to select the button within the GUI.

* * * * *